United States Patent [19]

Myers, deceased

[11] Patent Number: 4,708,785
[45] Date of Patent: * Nov. 24, 1987

[54] CARBO-METALLIC OIL CONVERSION

[75] Inventor: George D. Myers, deceased, late of Ashland, Ky., by Virginia K. Myers, administratrix

[73] Assignee: Ashland Oil, Inc., Ashland, Ky.

[*] Notice: The portion of the term of this patent subsequent to Nov. 10, 1998 has been disclaimed.

[21] Appl. No.: 694,719

[22] Filed: Mar. 20, 1985

Related U.S. Application Data

[60] Continuation-in-part of Ser. No. 485,574, Apr. 1, 1983, Pat. No. 4,602,993, which is a continuation-in-part of Ser. No. 306,813, Sep. 29, 1982, Pat. No. 4,390,415, which is a division of Ser. No. 94,092, Nov. 14, 1979, Pat. No. 4,332,673.

[51] Int. Cl.$^4$ ............................................. C10G 11/18
[52] U.S. Cl. .................................... 208/113; 208/159; 502/43
[58] Field of Search ...................... 208/113, 120, 159; 502/41, 43

[56] References Cited

U.S. PATENT DOCUMENTS 4,009,121  2/1977  Luckenbach ........................... 502/44
4,332,673  6/1982  Myers ................................... 208/120

FOREIGN PATENT DOCUMENTS 1111588  5/1968  United Kingdom .
2001545  2/1979  United Kingdom .

Primary Examiner—Olik Chaudhuri
Attorney, Agent, or Firm—Richard C. Willson, Jr.; James L. Wilson

[57] ABSTRACT

Heat balance in a residual oil conversion unit can be controlled as a function of Conradson carbon of the feed, water added to the feed, hydrogen in the coke produced, $CO_2/CO$ ratio, etc. Preferably, riser outlet temperature can be controlled to less than about 538° C. (1000° F.) at $CO_2/CO$ flue gas ratios of 3/1 or less. Especially preferred are operations in a two-stage regenerator with cracking catalyst comprising at least 5000 ppm of Ni+V and residual carbon on regenerated catalyst of at least 0.1 wt. %. The contact time in the second stage of the regenerator being less than about ½ of that employed in the first stage, and with oxygen-lean gas being employed in the first stage. The heat transferred by the catalyst to the residual oil feed is preferably limited to about 500 to 1200 btu per pound of oil feed.

16 Claims, 9 Drawing Figures

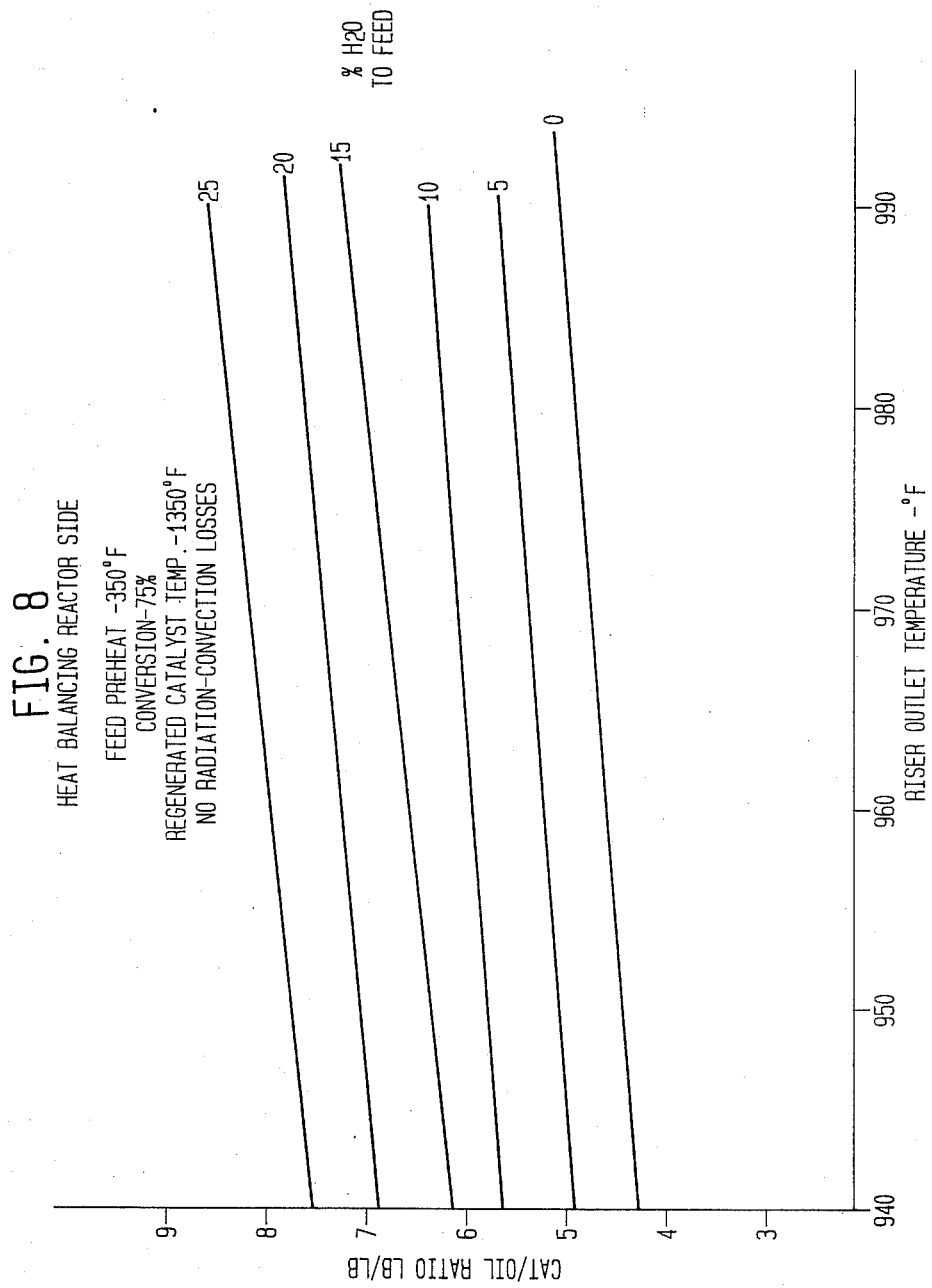

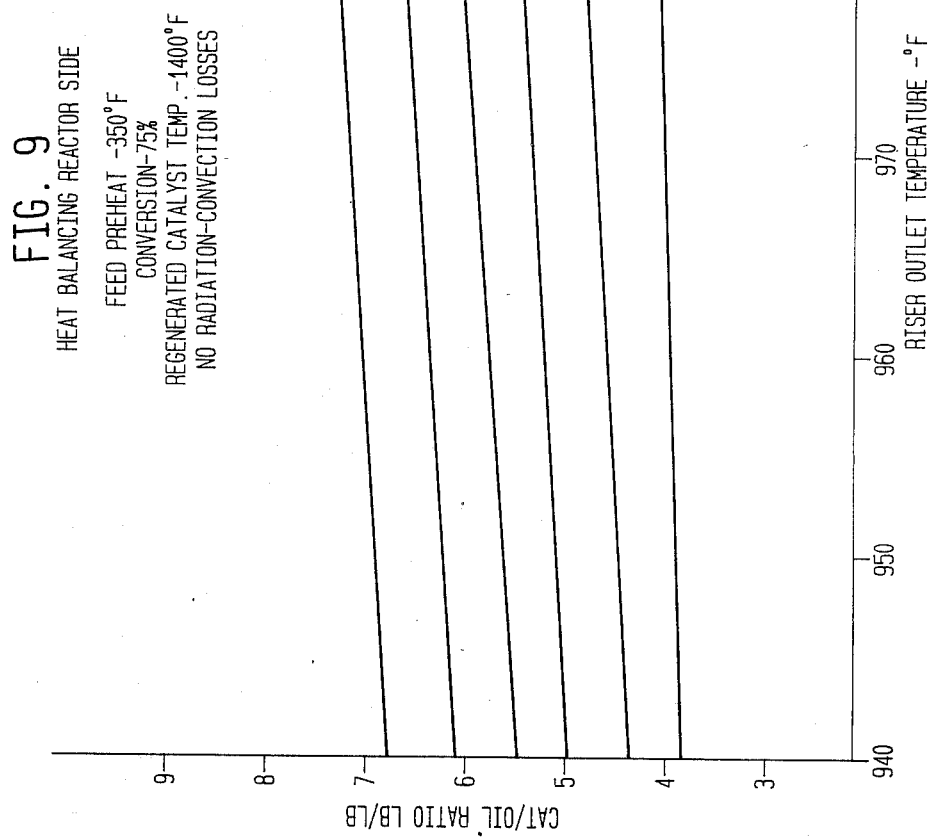

CARBO-METALLIC OIL CONVERSION

This application is a continuation-in-part of application U.S. Ser. No. 485,574, filed Apr. 1, 1983, now U.S. Pat. No. 4,602,993, which is a continuation-in-part of application U.S. Ser. No. 306,813, filed Sept. 29, 1982, now U.S. Pat. No. 4,390,415 issued June 28, 1983. U.S. Pat. No. 4,390,415 is a divisional of application U.S. Ser. No. 94,092, filed Nov. 14, 1979, now U.S. Pat. No. 4,332,673, issued June 1, 1982.

BACKGROUND OF THE INVENTION

In general, gasoline and other liquid hydrocarbon fuels boil in the range of about 38° to about 343° C. (about 100° to about 650° F.). However, the crude oil from which these fuels are made contains a diverse mixture of hydrocarbons and other compounds which vary widely in molecular weight and therefore boil over a wide range. For example, crude oils are known in which 30 to 60% or more of the total volume of oil is composed of compounds boiling at temperatures above 343° C. (650° F.). Among these are crudes in which about 10% to about 30% or more of the total volume consists of compounds so heavy in molecular weight that they boil above 552° C. (1025° F.) or at least will not boil below 552° C. (1025° F.) at atmospheric pressure.

Because these relatively abundant high boiling components of crude oil are unsuitable for inclusion in gasoline and other liquid hydrocarbon fuels, the petroleum refining industry has developed processes for cracking or breaking the molecules of the high molecular weight, high boiling compounds into smaller molecules which do boil over an appropriate boiling range. The cracking process which is most widely used for this purpose is known as fluid catalytic cracking (FCC). Although the FCC process has reached a highly advanced state, and many modified forms and variations have been developed, their unifying factor is what a vaporized hydrocarbon feedstock is caused to crack at an elevated temperature in contact with a cracking catalyst that is suspended in the feedstock vapors. Upon attainment of the desired degree of molecular weight and boiling point reduction the catalyst is separated from the desired products.

Crude oil in the natural state contains a variety of materials which tend to have quite troublesome effects on FCC processes, and only a portion of these troublesome materials can be economically removed from the crude oil. Among these troublesome materials are coke precursors (such as asphaltenes, polynuclear aromatics, etc.), heavy metals (such as nickel, vanadium, iron, copper, etc.) lighter metals (such as sodium, potassium, etc.) sulfur, nitrogen and others. Certain of these, such as the lighter metals, can be economically removed by desalting operations which are part of the normal procedure for pretreating crude oil for fluid catalytic cracking. Other materials, such as coke precursors, asphaltenes and the like, tend to break down into coke during the cracking operation, which coke deposits on the catalyst, impairing contact between the hydrocarbon feedstock and the catalyst, and generally reducing its potency or activity level. The heavy metals transfer almost quantitatively from the feedstock to the catalyst surface.

If the catalyst is reused again and again for processing additional feedstock, which is usually the case, the heavy metals can accumulate on the catalyst to the point that they unfavorably alter the composition of the catalyst and/or the nature of its effect upon the feedstock. For example, vanadium tends to form fluxes with certain components of commonly used FCC catalysts, lowering the melting point of portions of the catalyst particles sufficiently so that they begin to sinter and become ineffective cracking catalysts. Accumulations of vanadium and other heavy metals, especially nickel, also "poison" the catalyst. They tend in varying degrees to promote excessive dehydrogenation and aromatic condensation, resulting in excessive production of carbon and gases with consequent impairment of liquid fuel yield. An oil such as a crude or crude fraction or other oil that is particularly abundant in nickel and/or other metals exhibiting similar behavior, while containing relatively large quantities of coke precursors, is referred to herein as a carbo-metallic oil, and represents a particular challenge to the petroleum refiner.

In general the coke-forming tendency or coke precursor content of an oil can be ascertained by determining the weight percent of carbon remaining after a sample of that oil has been pyrolyzed. The industry accepts this value as a measure of the extent to which a given oil tends to form non-catalytic coke when employed as feedstock in a catalytic cracker. Two established tests are recognized, the Conradson Carbon and Ramsbottom Carbon tests, the latter being described in ASTM Test No. D524-76. In conventional FCC practice, Ramsbottom carbon values on the order of about 0.1 to about 1.0 are regarded as indicative of acceptable feed. The present invention is concerned with the use of hydrocarbon feedstocks which have higher Ramsbottom carbon values and thus exhibit substantially greater potential for coke formation than the usual feeds.

Since the various heavy metals are not of equal catalyst poisoning activity, it is convenient to express the poisoning activity of an oil containing a given poisoning metal or metals in terms of the amount of a single metal which is estimated to have equivalent poisoning activity. Thus, the heavy metals content of an oil can be expressed by the following formula (patterned after that of W. L. Nelson in *Oil and Gas Journal,* page 143, Oct. 23, 1961) in which the content of each metal present is expressed in parts per million of such metal, as metal, on a weight basis, based on the weight of feed:

$$\text{Nickel Equivalents} + \text{Ni} = \frac{V}{4.8} + \frac{Fe}{7.1} + \frac{Cu}{1.23}$$

According to conventional FCC practice, the heavy metal content of feedstock for FCC processing is controlled at a relatively low level, e.g. about 0.25 ppm Nickel Equivalents or less. The present invention is concerned with the processing of feedstocks containing metals substantially in excess of this value, and which therefore have a significantly greater potential for accumulating on and poisoning catalyst.

The above formula can also be employed as a measure of the accumulation of heavy metals on cracking catalyst, except that the quantity of metal employed in the formula is based on the weight of catalyst (moisture free basis) instead of the weight of feed. In conventional FCC practice, in which a circulating inventory of catalyst is used again and again in the processing of fresh feed, with periodic or continuing minor addition and withdrawal of fresh and spent catalyst, the metal content of the catalyst is maintained at a level which may for example be in the range of about 200 to about 600 ppm Nickel Equivalents. The process of the present invention is concerned with the use of catalyst having a substantially larger metals content, and which therefore has a much greater than normal tendency to promote dehydrogenation, aromatic condensation, gas production or coke formation. Therefore, such higher metals accumulation is normally regarded as quite undesirable in FCC processing.

There has been a long standing interest in the conversion of carbo-metallic oils into gasoline and other liquid fuels. For example, in the 1950s it was suggested that a variety of carbo-metallic oils could be successfully converted to gasoline and other products in the Houdresid process. Turning from the FCC mode of operation, the Houdresid process employed catalyst particles of "granular size" (much larger than conventional FCC catalyst particle size) in a compact gravitating bed, rather than suspending catalyst particles in feed and product vapors in a fluidized bed. The productivity of the process, compared to fluid catalytic cracking with lighter gas oils, was low. But the Houdresid process did offer some advantages. It appeared that the adverse effects previously encountered with heavy metals in the feed were not as great a barrier in the Houdresid process as one might expect in FCC processing. The heavy metal which accumulated on or near the outer surfaces of the catalyst particles apparently could be removed to some extent by an attrition process, which selectively removed an outer layer of metal-contaminated catalyst. The catalysts were very cheap, but also relatively inactive, highly unsuitable by today's standards. While the maximum tolerable limit of heavy metal contamination on catalyst in fluid catalytic cracking was then thought to be about 200 parts per million, the Houdresid process did continue to operate satisfactorily even when the total nickel plus vanadium content of the catalyst had reached 870 ppm. Moreover, it was found that the required levels of selectivity could be maintained without withdrawing catalyst from the process, except to the extent that withdrawal was required by normal mechanical losses (e.g. attrition and inadvertent discharge with off gases) and by the attrition used to control metals level. Today such attrition of catalyst to fine particulates would present an expensive environmental problem, thus considerably increasing difficulties involved in practicing the process.

Although the Houdresid process obviously represented a step forward in dealing with the effects of metal contamination and coke formation on catalyst performance, its productivity was limited. Because its operation was uneconomical, the first Houdresid unit is no longer operating. Thus, for the 25 years which have passed since the Houdresid process was first introduced commercially, the art has continued its arduous search for suitable modifications or alternatives to the FCC process which would permit commercially successful operation on reduced crude and the like. During this period a number of proposals have been made; some have been used commercially to certain extent.

Several proposals involve treating the heavy oil feed to remove the metal therefrom prior to cracking, such as by hydrotreating, solvent extraction and complexing with Friedel-Crafts catalyst, but these techniques have been criticized as unjustified, economically. Another proposal employs a combination cracking process having "dirty oil" and "clean oil" units. Still another proposal blends residual oil with gas oil and controls the quantity of residual oil in the mixture in relation to the equilibrium flash vaporization temperature at the bottom of the riser type cracker unit employed in the process. Still another proposal subjects the feed to a mild preliminary hydrocracking or hydrotreating operation before it is introduced into the cracking unit. It has also been suggested to contact a carbo-metallic oil such as reduced crude with hot taconite pellets to produce gasoline. This is a small sampling of the many proposals which have appeared in the patent literature and technical reports.

Notwithstanding the great effort which has been expended and the fact that each of these proposals overcomes some of the difficulties involved, conventional FCC practice today bears mute testimony to the dearth of carbo-metallic oil-cracking techniques that are both economical and highly practical in terms of technical feasibility. Some crude oils are relatively free of coke precursors or heavy metals or both, and the troublesome components of crude oil are for the most part concentrated in the highest boiling fractions. Accordingly, it has been possible to largely avoid the problems of coke precursors and heavy metals by sacrificing the liquid fuel yield which would be potentially available from the highest boiling fractions. More particularly, conventional FCC practice has employed as feedstock that fraction of crude oil which boils at about 343° C. to about 538° C. (about 650° F. to about 1000° F.), such fractions being relatively free of coke precursors and heavy metal contamination. Such feedstock, known as "vacuum gas oil" (VGO) is generally prepared from crude oil by distilling off the fractions boiling below about 343° C. (about 650° F.) at atmospheric pressure and then separating by further vacuum distillation from the heavier fractions a cut boiling between about 343° C. (about 650° F.) and about 482° C. to 552° C. (about 900° to 1025° F.).

The vacuum gas oil is used as feedstock for conventional FCC processing. The heavier fractions are normally employed for a variety of other purposes, such as for instance production of asphalt, residual fuel oil, #6 fuel oil, or marine Bunker C fuel oil, which represents a great waste of the potential value of this portion of the crude oil, especially in light of the great effort and expense which the art has been willing to expend in the attempt to produce generally similar materials from coal and shale oils. The present invention is aimed at the simultaneous cracking of these heavier fractions containing substantial quantities of both coke precursors and heavy metals, and possibly other troublesome components, in conjunction with the lighter oils, thereby increasing the overall yield of gasoline and other hydrocarbon liquid fuels from a given quantity of crude. As indicated above, the present invention by no means constitutes the first attempt to develop such a process but the long standing recognition of the desirability of cracking carbo-metallic feedstocks, along with the slow progress of the industry toward doing so, show the continuing need for such a process. It is believed that the present process is uniquely advantageous for dealing with the problem of treating such carbo-metallic oils in an economically and technically sound manner.

SUMMARY OF THE INVENTION

The present invention comprises processes for catalytically cracking a metal-contaminated residual oil feedstock containing components that do not boil below about 552° C. (about 1025° F.), greater than about 15 ppm by weight of Nickel+Vanadium and at least about 200 ppm basic nitrogen, which comprise: contacting said feedstock at a temperature in the range of about 177° C. (about 350° F.) to about 343° C. (about 650° F.) in a riser cracking zone in the presence of about 5-20 wt% water based on feed in the absence of added hydrogen with a regenerated cracking catalyst at a temperature in the range of about 704° C. (about 1300° F.) to about 815° C. (about 1500° F.) characterized by a metals content greater than about 5,000 ppm by weight of Nickel plus Vanadium and having a carbon content greater than about 0.1% wt% to form cracked products and deactivating said catalyst while accumulating metal contaminants and hydrocarbonaceous deposits, separating said deactivated catalyst from said cracked products; recovering said cracked products comprising gasoline and higher boiling liquid products, passing said separated, deactivated catalyst to a regeneration zone; regenerating said deactivated catalyst comprising hydrocarbonaceous deposits and metal contaminants in a regeneration zone under conditions to product a CO-rich flue gas and provide a regenerated cracking catalyst having greater than about 0.1 wt% residual carbon at a temperature in the range of about 704° C. (about 1300° F.) to about 815° C. (about 1500° F.), and recycling said regenerated catalyst to said cracking zone.

Differently stated, the invention comprises processes for catalytically cracking a carbo-metallic containing residual feedstock containing components boiling above about 552° C. (about 1025° F.), greater than about 15 ppm by weight of Nickel+Vanadium and at least about 200 ppm basic nitrogen, which comprises: contacting said feedstock at a temperature in the range of about 177° C. (about 350° F.) to about 343° C. (about 650° F.) in a riser cracking zone in the presence of about 5-20 wt% water based on feed and in the absence of added molecular hydrogen with a fluidized, regenerated cracking catalyst characterized by a metal content greater than about 5,000 ppm by weight of Nickel+Vanadium and having a carbon content greater than about 0.1 -wt%, thereby forming cracked products and coked catalyst; said cracked products containing gasoline being characterized by an octane value greater than about 90 neat and containing oxygenated compounds; separating said coked catalyst from said cracked products by separation means such that less than about 1% of the coked catalyst is carried over to the product separation section; passing said separated coked catalyst to a two-stage regeneration zone; regenerating said coked catalyst preferably in a two-stage regeneration zone with an oxygen-containing gas at about 704° C. (about 1300° F.) or higher or about 760° C. (about 1400° F.) or higher, such that about 75% or more of the coke is removed in a first regeneration stage and the contact time in a subsequent stage or stages is less than about one-half of that in the first stage to minimize hydrothermal degradation, and recovering said regenerated catalyst with more than about 0.1 wt% residual carbon, preferably with the production of a flue gas containing a low $CO_2/CO$ ratio, preferably below about 2/1, and the oxygen content preferably below combustion supporting levels; recycling said regenerated catalyst to said riser cracking zone with the unit in complete heat balance, preferably by the combination of water addition to the riser, low temperature feed preheat and the low oxygen utilization, low thermal output per pound of coke of the two-stage regenerator, thereby selectively forming liquid cracked products.

The process as described in either of the two preceding paragraphs may also be operated: (a) with feedstocks containing more than about 30 or more than about 50 ppm by weight of nickel pus vanadium, and/or more than about 15, more than about 17 or more than about 20, and up to about 80, or 100 or even more of Nickel Equivalents of metals; and/or (b) with catalysts including more than 6,500 or more than 8,500 ppm by weight of nickel pus vanadium, and/or more than 5,000, more than 8,000, or more than 10,000, and up to 20,000, 25,000 or more, of Nickel Equivalents of metals. Operation with catalyst regenerated to a residual carbon content greater than about 0.10 wt% can provide a certain amount of protection of the catalyst, such as protection from various forms of hydrothermal degradation and/or fluxing, but if one is willing to sacrifice these benefits, for example to obtain maximum catalyst activity the procedure of either of the two preceding paragraphs may be varied to include regeneration to, and/or contacting of the feed with, catalyst having about 0.10 wt% or less of residual carbon. The water referred to above is preferably mixed with the feed before the feed contacts the catalyst.

This disclosure shall also be considered to include the subject matter of U.S. patent application Ser. Nos. 355,661 (Mar. 12, 1982), 288,572 (May 13, 1981), 094,216 (Nov. 14, 1979) and 94,092 (Nov. 14, 1979) the contents of which are hereby incorporated herein by reference, this application being a continuation in part of the said Ser. No. 094,092.

BRIEF DESCRIPTION OF THE DRAWINGS

FIG. 8 is a graph which plots catalyst to oil ratio against riser outlet temperature for different water levels in the feed employing catalyst at 732° C. (1350° F.).

FIG. 9 is a graph which plots catalyst to oil ratio against riser outlet temperature for different water levels in the feed employing catalyst at 760° C. (1400° F.).

DESCRIPTION OF VARIOUS AND PREFERRED EMBODIMENTS

Figure 1:
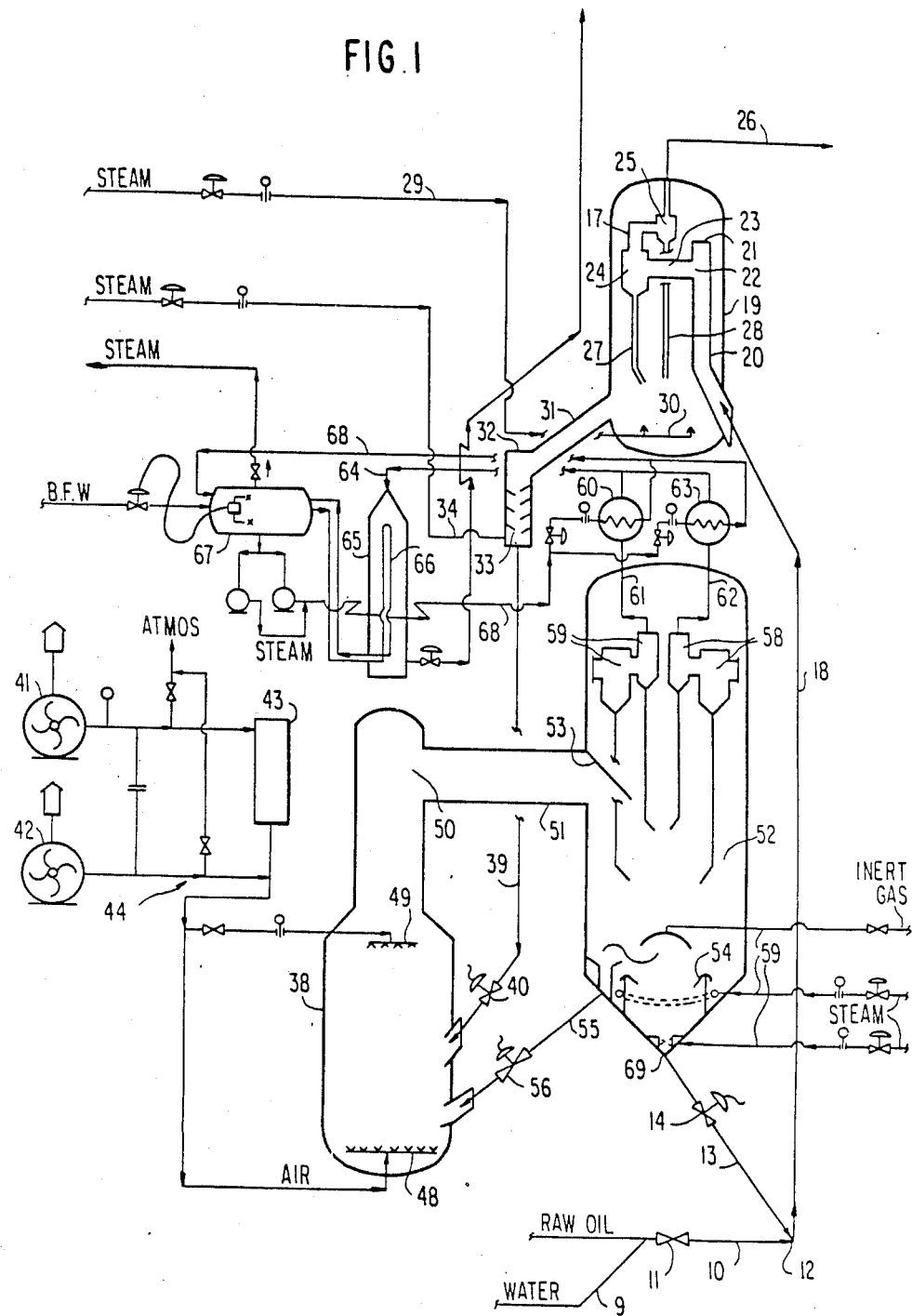
FIG. 1 is a schematic diagram of a first apparatus for carrying out the invention.

The present invention provides a process for the continuous catalytic conversion of a wide variety of carbo-metallic oils to lower molecular weight products, while maximizing production of highly valuable liquid products, and making it possible, if desired, to avoid vacuum distillation and other expensive treatments such as hydrotesting. The term "oils," includes not only those predominantly hydrocarbon compositions which are liquid at room temperature (i.e., 20° C. (68° F.)), but also those predominantly hydrocarbon compositions which are asphalts or tars at ambient temperature but liquify when heated to temperatures in the range of up to about 427° C. (about 800° F.). The invention is applicable to carbo-metallic oils, whether of petroleum origin or not. For example, provided they have a similar boiling range, carbon residue on pyrolysis and heavy metals content, the invention may be applied to the processing of such widely diverse materials as heavy bottoms from crude oil, heavy bitumen crude oil, those crude oils known as "heavy crude" which approximate the properties of reduced crude; shale oil, tar sand extract, products from coal liquification and solvated coal, atmospheric and vacuum reduced crude, extracts and-/or bottoms (raffinate) from solvent de-asphalting, aromatic extract from lube oil refining, tar bottoms, heavy cycle oil, slop oil, other refinery waste streams and mixtures of the foregoing. Such mixtures can for instance be prepared by mixing available hydrocarbon fractions, including oils, tars, pitches and the like. Also, powered coal may be suspended in the carbo-metallic oil. Persons skilled in the art are aware of techniques for demetalation of carbo-metallic oils, and demetalated oils may be converted using the invention; but is is an advantage of the invention that it can employ as feedstock carbo-metallic oils that have had no prior demetalation treatment. Likewise, the invention can be applied to hydrotreated feedstocks; but it is an advantage of the invention that it can successfully convert carbo-metallic oils which have had substantially no prior hydrotreatment. However, the preferred application of the process is to reduced crude, i.e., that fraction of crude oil boiling at and above 343° C. (650° F.), alone or in admixture with virgin gas oils. While the use of material that has been subjected to prior vacuum distillation is not excluded, it is an advantage of the invention that it can satisfactorily process material which has had no prior vacuum distillation, thus saving on capital investment and operating costs as compared to conventional FCC processes that require a vacuum distillation unit.

Table I below provides a comparison between a typical vacuum gas oil (VGO) which has been used heretofore in fluid catalytic cracking, with various reduced crudes, constituting a few examples of the many reduced crudes useable in the present invention:

Gravity cat cracker feedstocks have been considered highly superior to higher boiling and/or lower API Gravity feedstocks. Comparisons of the gasoline yield of high boiling feeds compared to medium boiling feeds at constant coke yield have shown that the medium boiling feeds provide superior gasoline yield for a given coke yield.

In accordance with the invention one provides a carbo-metallic oil feedstock, at least about 70%, more preferably at least about 85% and still more preferably about 100% (by volume) of which boils at and above about 343° C. (about 650° F.). All boiling temperatures herein are based on standard atmospheric pressure conditions. In carbo-metallic oil partly or wholly composed of material which boils at and above about 343° C. (about 650° F.), such material is referred to herein as 343° C.+ (650° F.+) material; and 343° C.+ (650° F.+) material which is part of or has been separated from an oil containing components boiling above and below 343° C. (650° F.) may be referred to as a 343° C.+ (650° F.+) fraction. But the terms "boils above" and "343° C.+ (650° F.+)" are not intended to imply that all of the material characterized by said terms will have the capability of boiling. The carbo-metallic oils contemplated by the invention may contain material which may not boil under any conditions; for example, certain asphalts and asphaltenes may crack thermally during distillation, apparently without boiling. Thus, for example, when it is said that the feed comprises at least about 70% by volume of material which boils above about 343° C. (about 650° F.) it should be understood that the 70% in question may include some material which will not boil or volatilize at any temperature. These non-boilable materials, when present, may frequently or for the most part be concentrated in portions of the feed which do not boil below about 538° C. (about 1000° F.) or 552° C. (1025° F.) or higher. Thus, when it is said that at least about 10% more preferably about 15% and still more preferably at least about 20% (by volume) of the 343° C.+ (650° F.+) fraction will not boil below 538° C. (1000° F.), it should be understood that all or any part of the material not boiling below about 538° C. (about 1000° F.) or 552° C. (1025°

TABLE I

| Oil or Crude | API Gray 650+[2] Total | Volume % of 650+ Fraction Boiling at | | Ramsbottom Carbon Content | | Wt. ppm Metals[3] | | | | Wt.% S in 650+ Total | Weight of Nitrogen (ppm) 650+ Fraction | | Wt. ppm Na |
|---|---|---|---|---|---|---|---|---|---|---|---|---|---|
| | | 650–1025 | 1025+ | 650–1025 | 650+ Total | Ni | V | Fe | Ni Equiv. | | Total | Basic | |
| VGO | 28.4 | 100 | 0.0 | 0.38 | 0.38 | 0.2 | 0.1 | 2.6 | .059 | .83 | 722 | 260 | 0.8 |
| Mexican Isthmus | 16.9 (21.3) | 65.3 | 34.7 | 0.49 | 4.96 | 2.5+ | 33.8 | 1.9 | 9.81 | 2.75 | 950 | 450 | 6.9 |
| Mexican Kurkuk[1] | 17.4 | | | | 9.30 | 35.0 | 99.0 | 17.0 | 58.02 | 2.94 | 2100 | 723 | 1.8 |
| Murban | 23.1 | 78.7 | 21.3 | 0.49 | 3.99 | 3.0+ | 1.5 | 11.9 | 4.99 | 1.64 | 512 | 200 | 7.5 |
| Arabian Light | 19.1 | 64.7 | 35.3 | 0.47 | 6.56 | 6.4 | 24.7 | 3.2 | 12.00 | 2.39 | 940 | 507 | 9.2 |
| Arabian Med. | 14.5 | 51.8 | 48.2 | 0.46 | 9.00 | 19.6 | 63.0 | 2.9 | 33.13 | 4.43 | | | |
| Ekofish | 22.7 | 72.8 | 27.2 | 0.36 | 4.42 | 1.4 | 3.0 | 2.4 | 2.36 | 0.38 | | | |
| Fosterton | 10.9 | 43.6 | 56.4 | 0.42 | 16.81 | 48.8 | 119.0 | 3.1 | 74.03 | 4.22 | | | |
| Iranian Light | 17.4 | 60.8 | 39.2 | 0.48 | 9.01 | 21.9 | 60.0 | 3.1 | 34.84 | 2.50[4] | | | |
| La/Miss Sweet | 23.7 | 80.2 | 19.8 | 0.33 | 4.36 | 2.7+ | — | 8.5 | 3.90 | 0.26 | | | |
| Wyoming Sour | 12.4 | 40.7 | 59.3 | 0.32 | 15.1 | 0.6 | 70.0 | 2.0 | 15.47 | 3.84 | | | |

[1]A refinery blend of Mexican and Kirkuk crudes.
[2]Throughout the table 650 and 1025 refer to 343° C. (650° F.) and 552° C. (1025° F.) respectively: 650+ refers to 650° F.+ material as defined below.
[3]Cooper level was below 0.5%, except that Mexican Kirkuk contained 0.6%; all metals expressed as metal in ppm, based on the weight of the 650+ fraction.
[4]Calculated.

As can be seen from the Table, the heavier or higher boiling feeds are characterized by relatively low API Gravity values than the illustrative vacuum gas oil (VGO). In general lower boiling and/or higher API F.), may or may not be volatile at and above the indicated temperature.

Preferably, the contemplated feeds, or at least the 343° C.+ (650° F.+) material therein, have a carbon residue on pyrolysis of at least about 2 or greater. For example, the Ramsbottom carbon content may be in the range of about 2 to about 12 and most frequently at least about 4. A particularly common range is about 4 to about 8. Note that the illustrative VGO in Table 1 has a Ramsbottom carbon residue value of 0.38, and that the 343° C. (650° F.) to 552° C. (1025° F.) fractions of the various reduced crudes have Ramsbottom carbon values between about 0.3 and about 0.5, whereas the various reduced crudes as a whole (650+ Total) vary upwards in Ramsbottom carbon value from about 4 to about 16.8, and still higher values are contemplated.

Preferably, the feed has an average composition characterized by an atomic hydrogen to carbon ratio in the range of about 1.2 to about 1.9, and preferably about 1.3 to about 1.8.

The carbo-metallic feeds employed in accordance with the invention, or at least the 343° C. (650° F.+) material therein, may contain at least about 4 parts per million of Nickel Equivalents, as defined above, of which at least about 2 parts per million is nickel (as metal, by weight). Carbo-metallic oils within the above range can be prepared from mixtures of two or more oils, some of which do and do not contain the quantities of Nickel Equivalents and nickel set forth above. It should also be noted that the above values for Nickel Equivalents and nickel represent time-weighted averages for a substantial period of operation of the conversion unit, such as one month, for example. It should also be noted that the heavy metals have in certain circumstances exhibited some lessening of poisoning tendency after repeated oxidations and reductions on the catalyst, and the literature describes criteria for establishing "effective metal" values. For example, see the article for Cimablo, et al, entitled "Deposited Metals Poison FCC Catalyst," *Oil and Gas Journal,* May 15, 1972, pp 112–122, the contents of which are incorporated herein by reference. If considered necessary or desirable, the contents of Nickel Equivalents and nickel in the carbo-metallic oils processed according to the invention may be expressed in terms of "effective metal" values. Notwithstanding the gradual reduction in poisoning activity noted by Cimbalo, et al, the regeneration of catalyst under normal FCC regeneration conditions may not, and usually does not, severely impair the dehydrogenation, demethanation and aromatic condensation activity of heavy metals accumulated on cracking catalyst.

It is known that about 0.2 to about 5 weight percent of "sulfur" in the form of elemental sulfur and/or its compounds (but reported as elemental sulfur based on the weight of feed) appears in FCC feeds and that the sulfur and demodified forms of sulfur can find their way into the resultant gasoline product and, where lead is added, tends to reduce its susceptibility to octane enhancement. Sulfur in the product gasoline often requires sweetening when processing high sulfur containing crudes. To the extent that sulfur is present in the coke, it also represents a potential air pollutant since the regenerator burns it to $SO_2$ and $SO_3$. However, we have found that in our process the sulfur in the feed is on the other hand able to inhibit heavy metal activity by maintaining metals such as Ni, V, Cu and Fe in the sulfide form in the reactor. These sulfides are much less active than the metals themselves in promoting dehydrogenation and coking reactions. Accordingly, it is acceptable to carry out the invention with a carbo-metallic oil having at least about 0.3% acceptably more than about 0.8% and more acceptably at least about 1.5% by weight of sulfur in the 650° F.+ fraction.

The carbo-metallic oils useful in the invention may and usually do contain significant quantities of compounds containing nitrogen, a substantial portion of which may be basic nitrogen. For example, the total nitrogen content of the carbo-metallic oils may be at least about 0.05% by weight. Since cracking catalysts owe their cracking activity to acid sites on the catalyst surface or in its pores, basic nitrogen-containing compounds may temporarily neutralize these sites, poisoning the catalyst. However, the catalyst is not permanently damaged since the nitrogen can be burned off the catalyst during regeneration, as a result of which the acidity of the active sites is restored.

The carbo-metallic oils may also include significant quantities of pentane insolubles, for example at least about 0.5% by weight, and more typically about 2% or more or even about 4% or more. These may include for instance asphaltenes and other materials.

Alkali and alkaline earth metals generally do not tend to vaporize in large quantities under the distillation conditions employed in distilling crude oil to prepare the vacuum gas oils normally used as FCC feedstocks. Rather, these metals remain for the most part in the "bottoms" fraction (the non-vaporized high boiling portion) which may for instance be used in the production of asphalt or other by-products. However, reduced crude and other carbo-metallic oils are in many cases bottoms products, and therefore may contain significant quantities of alkali and alkaline earth metals such as sodium. These metals deposit upon the catalyst during cracking. Depending on the composition of the catalyst and magnitude of the regeneration temperatures to which it is exposed, these metals may undergo interactions and reactions with the catalyst (including the catalyst support) which are not normally experienced in processing VGO under conventional FCC processing conditions. If the catalyst characteristics and regeneration conditions so require, one will of course take the necessary precautions to limit the amounts of alkali and alkaline earth metal in the feed, which metals may enter the feed not only as brine associated with the crude oil in its natural state, but also as components of water or steam which are supplied to the cracking unit. Thus, careful desalting of the crude used to prepare the carbo-metallic feed may be important when the catalyst is particularly susceptible to alkali and alkaline earth metals. In such circumstances, the content of such metals (hereinafter collectively referred to as "sodium") in the feed can be maintained at about 1 ppm or less, based on the weight of the feedstock. Alternatively, the sodium level of the feed may be keyed to that of the catalyst, so as to maintain the sodium level of the catalyst which is in use substantially the same as or less than that of the replacement catalyst which is charged to the unit.

According to a particularly referred embodiment of the invention, the carbo-metallic oil feedstock constitutes at least about 70% by volume of material which boils above about 343° C. (about 650° F.), and at least about 10% of the material which boils above about 343° C. (about 650° F.), will not boil below about 552° C. (about 1025° F.). The average composition of their 650° F.+ material may be further characterized by: (a) an atomic hydrogen to carbon ratio in the range of about 1.3 to about 1.8: (b) a Ramsbottom carbon value of at least about 2; (c) at least about four parts per million of Nickel Equivalents, as defined above, of which at least about two parts per million is nickel (as metal, by weight); and (d) at least one of the following: (i) at least about 0.3% by weight of sulfur, (ii) at least about 0.05% by weight of nitrogen, and (iii) at least about 0.5% by weight of pentane insolubles. Very commonly, the preferred feed will include all of (i), (ii), and (iii), and other components found in oils of petroleum and non-petroleum origin may also be present in varying quantities providing they do not prevent operation of the process.

Although there is no intention of excluding the possibility of using a feedstock which has previously been subjected to some cracking, the present invention has the definite advantage that it can successfully produce large conversions and very substantial yields of liquid hydrocarbon fuels from carbo-metallic oils which have not been subjected to any substantial amount of cracking. Thus, for example, and preferably, at least about 85%, more preferably at least about 90% and most preferably substantially all of the carbo-metallic feed introduced into the present process is oil which has not previously been contacted with cracking catalyst under cracking conditions. Moreover, the process of the invention is suitable for operation in a substantially once-through or single pass mode. Thus, the volume of recycle, if any, based on the volume of fresh feed is preferably about 15% or less and more preferably about 10% or less.

In general, the weight ratio of catalyst to fresh feed (feed which has not previously been exposed to cracking catalyst under cracking conditions) used in the process is in the range of about 3 to about 18. Preferred and more preferred ratios are about 4 to about 12, more preferably about 5 to about 10 and still more preferably about 6 to about 10, a ratio of about 6 to about 8 presently being considered most nearly optimum. Within the limitations of product quality requirements, controlling the catalyst to oil ratio at relatively low levels within the aforesaid ranges tends to reduce the coke yield of the process, based on fresh feed.

In conventional FCC processing VGO, the ratio between the number of barrels per day of plant through-put and the total number of tons of catalyst undergoing circulation throughout all phases of the process can vary widely. For purposes of this disclosure, daily plant through-put is defined as the number of barrels of fresh feed boiling above about 343° C. (about 650° F.) which that plant processes per average day of operation to liquid products boiling below about 221° C. (about 430° F.). For example, in one commercially successful type of FCC-VGO operation, about 8 to about 12 tons of catalyst are under circulation in the process per 1000 barrels per day of plant through-put. In another commercially successful process, this ratio is in the range of about 2 to 3. While the present invention may be practiced in the range of about 2 to about 30 and more typically about 2 to about 12 tons of catalyst inventory per 1000 barrels of daily plant through-put, it is preferred to carry out the process of the present invention with a very small ratio of catalyst weight to daily plant through-put. More specifically, it is preferred to carry out the process of the present invention with an inventory of catalyst that is sufficient to contact the the feed for the desired residence time in the above indicated catalyst to oil ratio while minimizing the amount of catalyst inventory, relative to plant through-put, which is undergoing circulation or being held for treatment in other phases of the process such as, for example, stripping, regeneration and the like. Thus, more particularly, it is preferred to carry out the process of the present invention with about 2 to about 5 and more preferably about 2 tons of catalyst inventory or less per thousand barrels of daily plant through-put.

In the practice of the invention, catalyst may be added continuously or periodically, such as, for example, to make up for normal losses of catalyst from the system. Moreover, catalyst addition may be conducted in conjunction with withdrawal of catalyst, such as, for example, to maintain or increase the average activity level of the catalyst in the unit. For example, the rate at which virgin catalyst is added to the unit may be in the range of about 0.1 to about 3, more preferably about 0.15 to about 2, and most preferably to about 0.2 to about 1.5 to about 2, and most preferably to about 0.2 to about 1.5 pounds per barrel of feed. If on the other hand equilibrium catalyst from FCC operation is to be utilized, replacement rates as high as about 5 pounds per barrel can be practiced. Where circumstances are such that the catalyst employed in the unit is below average in resistance to deactivation and/or conditions prevailing in the unit tend to promote more rapid deactivation, one may employ rates of addition greater than those stated above; but in the opposite circumstances, lower rates of addition may be employed.

Without wishing to be bound by any theory, it appears that a number of features of the process to be described in greater detail below, such as, for instance, the residence time and optional mixing of steam with the feedstock, tend to restrict the extent to which cracking conditions produce metals in the reduced state on the catalyst from heavy metal sulfide(s), sulfate(s) or oxide(s) deposited on the catalyst particles by prior exposures to carbo-metallic feedstock and regeneration conditions. Thus, the process appears to afford significant control over the poisoning effect of heavy metals on the catalyst, even when the accumulations of such metals are quite substantial.

Accordingly, the process may be practiced with catalyst bearing accumulations of heavy metals which heretofore would have been considered quite intolerable in conventional FCC-VGO operations. For these reasons, operation of the process with catalyst bearing heavy metals accumulations in the range of about 3,000 to about 70,000 ppm Nickel Equivalents, on the average is contemplated. More specifically, the accumulation may be in the range of about 4,000 to about 50,000 ppm and particularly more than about 5,000 to about 30,000 ppm. The foregoing ranges are based on parts per million of Nickel Equivalents, in which the metals are expressed as metal, by weight, measured on and based on regenerated equilibrium catalyst. However, in the event that catalyst of adequate activity is available at very low cost, making feasible very high rates of catalyst replacement, the carbo-metallic oil could be converted to lower boiling liquid products with catalyst bearing less than 3,000 ppm Nickel Equivalents of heavy metals. For example, one might employ equilibrium catalyst from another unit, for example, an FCC unit which has been used in the cracking of a feed, e.g. vacuum gas oil, having a carbon residue on pyrolysis of less than 1 and containing less than about 4 ppm Nickel Equivalents of heavy metals.

In any event, the equilibrium concentration of heavy metals in the circulating inventory of catalyst can be controlled (including maintained or varied as desired or needed) by manipulation of the rate of catalyst addition discussed above. Thus, for example, addition of catalyst may be maintained at a rate which will control the heavy metals accumulation on the catalyst in one of the ranges set forth above.

In general, it is preferred to employ a catalyst having a relatively high level of cracking activity, providing high levels of conversion and productivity at low residence times. The conversion capabilities of the catalyst may be expressed in terms of the conversion produced during actual operation of the process and/or in terms of conversion produced in standard catalyst activity tests. For example, it is preferred to employ catalyst which, in the course of extended operation in the process, is sufficiently active for sustaining a level of conversion of at least about 50% and more preferably at least about 60%. In this connection, conversion is expressed in liquid volume percent, based on fresh feed. Also, for example, the preferred catalyst may be defined as one which, in its virgin or equilibrium state, exhibits a specified activity expressed as a volume percentage derived by the MAT (micro-activity test). For purposes of the present invention the foregoing percentage is the volume percentage of standard feedstock that is converted to 221° C. (430° F.) end point gasoline and lighter products at 482° C. (900° F.), 16 whsv (weight hourly space velocity), calculated on the basis of catalyst dried at 593° C. (1100° F.) and 3C/O (catalyst to oil ratio) by tentative ASTM MAT test D-32, using an appropriate standard feedstock, e.g. Davison WHPS-12 primary gas oil, having the following analysis and properties:

TABLE II

| API Gravity at 60° F., degrees | 31.0 |
| --- | --- |
| Specific Gravity at 60° F., g/cc | 0.8708 |
| Ramsbottom Carbon, wt. % | 0.09 |
| Conradson Carbon, wt. % (est.) | 0.04 |
| Carbon, wt. % | 84.92 |
| Hydrogen, wt. % | 12.94 |
| Sulfur, wt. % | 0.68 |
| Nitrogen, ppm | 305 |
| Viscosity at 100° F., centistokes | 10.36 |
| Watson K Factor | 11.93 |
| Aniline Point | 182 |
| Bromine No. | 2.2 |
| Paraffines, Vol. % | 31.7 |
| Olefins, Vol. % | 1.8 |
| Naphthenes, Vol. % | 44.0 |
| Aromatics, Vol. % | 22.7 |
| Average Molecular Weight | 284 |
| Nickel | Trace |
| Vanadium | Trace |
| Iron | Trace |
| Sodium | Trace |
| Chlorides | Trace |
| B S & W | Trace |
| Distillation, °F. | ASTM D-1160 |
| IBP | 445 |
| 10% | 601 |
| 30% | 664 |
| 50% | 701 |
| 70% | 734 |
| 90% | 787 |
| FBP | 834 |

The end point of the gasoline produced in the MAT test is often defined as 221° C. (430° F.) tbp (true boiling point) which is a standard laboratory distillation, but other end points could serve equally well for our present purposes. Conversion is calculated by subtracting from 100 the volume percent (based on fresh feed) of those products heavier than gasoline which remain in the recovered product.

The catalyst may be introduced into the process in its virgin form or, as previously indicated, in other than virgin form; e.g. one may use equilibrium catalyst withdrawn from another unit, such as catalyst that has been employed in the cracking of a different feed. When characterized on the basis of MAT activity, the preferred catalysts may be described on the basis of their MAT activity "as introduced" into the process of the present invention, or on the basis of their "as withdrawn" or equilibrium MAT activity in the process of the present invention, or on both of these bases. A preferred MAT activity for virgin and non-virgin catalyst "as introduced" into the process of the present invention is at least about 60%, but it will be appreciated that, particularly in the case of non-virgin catalysts supplied at high addition rates, lower MAT activity levels may be acceptable. An acceptable "as withdrawn" or equilibrium MAT activity level of catalyst which has been used in the process of the present invention is about 20% or more, but about 40% or more and preferably about 60% or more are preferred values.

One may employ any hydrocarbon cracking catalyst having the above indicated conversion capabilities. A particularly preferred class of catalysts include those which have pore structures into which molecules of feed material may enter for adsorption and/or for contact with active catalytic sites within or adjacent the pores. Various types of catalysts are available within this classification, including for example the layered silicates, e.g. smectites. Although the most widely available catalysts within this classification are the well-known zeolite-containing catalysts, non-zeolite catalysts are also contemplated.

The preferred zeolite-containing catalysts may include any zeolite, whether natural, semi-synthetic or synthetic, alone or in admixture with other materials which do not significantly impair the suitability of the catalyst, provided the resultant catalyst has the activity and pore structure referred to above. For example, if the catalyst is a mixture, it may include the zeolite component associated with or dispersed in a porous refractory inorganic oxide carrier; in such case the catalyst may for example contain about 1% to about 60%, more preferably about 1 to about 40% and most typically about 5 to about 25% by weight, based on the total weight of catalyst (water free basis) of the zeolite, the balance of the catalyst being the porous refractory inorganic oxide alone or in combination with any of the known adjuvants for promoting or suppressing various desired and undesired reactions. For a general explanation of the genus of zeolite, molecular sieve catalysts useful in the invention, attention is drawn to the disclosures of the articles entitled "Refinery Catalysts Are a Fluid Business" and "Making Cat Crackers Work on Varied Diet," appearing respectively in the July 26, 1978 and Sept. 13, 1978 issues of Chemical Week magazine. The descriptions of the aforementioned publications are incorporated herein by reference.

For the most part, the zeolite components of the zeolite-containing catalysts will be those which are known to be useful in FCC cracking processes. In general, these are crystalline aluminosilicates, typically made up of tetra coordinated aluminum atoms associated through oxygen atoms with adjacent silicon atoms in the crystal structure. However, the term "zeolite" as used in this disclosure contemplates not only aluminosilicates, but also substances in which the aluminum has been partly or wholly replaced, such as for instance by gallium and/or other metal atoms, and further includes substances in which all or part of the silicon has been replaced, such as for instance by germanium. Titanium and zirconium substitution may also be practiced.

Most zeolites are prepared or occur naturally in the sodium form, so that sodium cations are associated with the electro negative sites in the crystal structure. The sodium cations tend to make zeolites inactive and much less stable when exposed to hydrocarbon conversion conditions, particularly high temperatures. Accordingly, the zeolite may be ion exchanged, and where the zeolite is a component of a catalyst composition, such ion exchanging may occur before or after incorporation of the zeolite as a component of the composition. Suitable cations for replacement of sodium in the zeolite crystal structure include ammonium (decomposable to hydrogen), hydrogen, rare earth metals, alkaline earth metals, etc. Various suitable ion exchange procedures and cations which may be exchanged into the zeolite crystal structure are well known to those skilled in the art.

Examples of the naturally occurring crystalline aluminosilicate zeolites which may be used as or included in the catalyst for the present invention are faujasite, mordenite, clinoptilote, chabazite, analcite, erionite, as well as levynite, dachiardite, paulingite, noselite, ferriorite, heulandite, scolccite, stibite, harmotome, phillipsite, brewsterite, flarite, datolite, gmelinite, caumnite, leucite, lazurite, scaplite, mesolite, phtholite, nepheline, matrolite, offretite and sodalite.

Examples of the synthetic crystalline aluminosilicate zeolites which are useful as or in the catalyst for carrying out the present invention are Zeolite X, U.S. Pat. No. 2,882,244, Zeolite Y, U.S. Pat. No. 3,130,007: and Zeolite A, U.S. Pat. No. 2,882,243; as well as Zeolite B, U.S. Pat. No. 3,008,803; Zeolite D, Canada Pat. No. 661,981; Zeolite E. Canada Pat. No. 614,495; Zeolite F, U.S. Pat. No. 2,996,358; Zeolite H. U.S. Pat. No. 3,010,789; Zeolite J. U.S. Pat. No. 3,011,869; Zeolite L, Belgian Pat. No. 575,177; Zeolite M. U.S. Pat. No. 2,995,423, Zeolite O, U.S. Pat. No. 3,140,252; Zeolite Q, U.S. Pat. No. 2,991,151; Zeolite S, U.S. Pat. No. 3,054,657, Zeolite T, U.S. Pat. No. 2,950,952; Zeolite W, U.S. Pat. No. 3,012,853; Zeolite Z, Canada Pat. No. 614,495; and Zeolite Omega, Canada Pat. No. 817,915. Also, ZK-4HJ, alpha beta and ZSM-type zeolites are useful. Moreover, the zeolites described in U.S. Pat. Nos. 3,140,249, 3,140,253, 3,944,482 and 4,137,151 are also useful, the disclosures of said patents being incorporated herein by reference.

The crystalline aluminosilicate zeolites having a faujasite-type crystal structure are particularly preferred for use in the present invention. This includes particularly natural faujasite and Zeolite X and Zeolite Y.

The crystalline aluminosilicate zeolites, such as synthetic faujasite, will under normal conditions crystallize as regularly shaped, discrete particles of about one to about ten microns in size, and, accordingly, this is the size range frequently found in commercial catalysts which can be used in the invention. Preferably, the particle size of the zeolites is from about 0.5 to about 10 microns and more preferably is from about 0.1 to about 2 microns or less. For example, zeolites prepared in situ from calcined kaolin may be characterized by even smaller crystallites. Crystalline zeolites exhibit both an interior and an exterior surface area, which we have defined as "portal" surface area, with the largest portion of the total surface area being internal. By portal surface area, we refer to the outer surface of the zeolite crystal through which reactants are considered to pass in order to convert to lower boiling products. Blockage of the internal channels by, for example, coke formation, blockage of entrance to the internal channels by deposition of coke in the portal surface area, and contamination by metals poisoning, will greatly reduce the total zeolite surface area. Therefore, to minimize the effect of contamination and pore blockage, crystals larger than the normal size cited above are preferably not used in the catalysts of this invention.

Commercial zeolite-containing catalysts are available with carriers containing a variety of metal oxides and combination thereof, including for example silica, alumina, magnesia, and mixtures thereof and mixtures of such oxides with clays as e.g. described in U.S. Pat. No. 3,034,948. One may for example select any of the zeolite-containing molecular sieve fluid cracking catalysts which are suitable for production of gasoline from vacuum gas oils. However, certain advantages may be attained by judicious selection of catalysts having marked resistance to metals. A metal resistant zeolite catalyst is, for instance, described in U.S. Pat. No. 3,944,482, in which the catalyst contains 1-40 weight percent of a rare earth-exchanged zeolite, the balance being a refractory metal oxide having specified pore volume and size distribution. Other catalysts described as "metals-tolerant" are described in the above mentioned Cimbalo et al article.

In general, it is preferred to employ catalysts having an over-all particle size in the range of about 5 to about 160, more preferably about 40 to about 120, and most preferably about 40 to about 80 microns.

The catalyst composition may also include one or more combustion promoters which are useful in the subsequent step of regenerating the catalyst. Cracking of carbo-metallic oils results in substantial deposition of coke on the catalyst, which coke reduces the activity of the catalyst. Thus, in order to restore the activity of the catalyst the coke is burned off in a regeneration step, in which the coke is converted to combustion gases including carbon monoxide and/or carbon dioxide. Various substances are known which, when incorporated in cracking catalyst in small quantities, tend to promote conversion of the coke to carbon monoxide and/or carbon dioxide. Promoters of combustion to carbon monoxide tend to lower the temperature at which a given degree of coke removal can be attained, thus diminishing the potential for thermal deactivation of the catalyst. Such promoters, normally used in effective amounts ranging from a trace up to about 10 or 20% by weight of the catalyst, may be of any type which generally promotes combustion of carbon under regenerating conditions, or may be somewhat selective in respect to completing the combustion of CO, or, more preferably, for reasons explained in greater detail below, may have some tendency to combust carbon to carbon monoxide in preference to carbon dioxide.

Although a wide variety of other catalysts, including both zeolite-containing and non-zeolite containing may be employed in the practice of the invention the following are examples of commercially available catalysts which have been employed in practicing the invention:

TABLE III

| | Specific Surface m²/g | Weight Percent | | | | | |
|---|---|---|---|---|---|---|---|
| | | Zeolite Content | Al₂O₃ | SiO₂ | Na₂O | Fe₂O | TiO₂ |
| AGZ-290 | 300 | 11.0 | 29.5 | 59.0 | 0.40 | 0.11 | 0.59 |
| GRZ-1 | 162 | 14.0 | 23.4 | 69.0 | 0.10 | 0.4 | 0.9 |
| CCZ-220 | 129 | 11.0 | 34.6 | 60.0 | 0.60 | 0.57 | 1.9 |
| Super DX | 155 | 13.0 | 31.0 | 65.0 | 0.80 | 0.57 | 1.6 |
| F-87 | 240 | 10.0 | 44.0 | 50.0 | 0.80 | 0.70 | 1.6 |
| FOC-90 | 240 | 8.0 | 44.0 | 52.0 | 0.65 | 0.65 | 1.1 |
| HFZ 20 | 310 | 20.0 | 59.0 | 40.0 | 0.47 | 0.54 | 2.75 |
| HEZ-55 | 210 | 19.0 | 59.0 | 35.2 | 0.60 | 0.60 | 2.5 |

The AGZ-290, GRZ-1, CCZ-220 and Super DX Catalysts referred to above are products of W. R. Grace and Co. F-87 and FOC-90 are products of Filtrol, while HFZ-20 and HEZ-55 are products of Engelhard/Houdry. The above are properties of virgin catalyst and, except in the case of zeolite content, are adjusted to a water free basis, i.e. based on material ignited at 954° C. (1750° F). The zeolite content is derived by comparison of the X-ray intensities of a catalyst sample and of a standard material composed of high purity sodium Y zeolite in accordance with draft #6, dated Jan. 9, 1978, of proposed ASTM Standard Method entitled "Determination of the Faujasite Content of a Catalyst."

It is considered an advantage that the process of the present invention can be conducted in the substantial absence of tin and/or antimony or at least in the presence of a catalyst which is substantially free of either or both of these metals.

The process of the present invention may be operated with the above described carbo-metallic oil and catalyst as substantially the sole materials charged to the reaction zone. But the charging of materials is not excluded. The charging of recycled oil to the reaction zone has already been mentioned. As described in greater detail below, still other materials fulfilling a variety of functions may also be charged. In such case, the carbo-metallic oil and catalyst usually represent the major proportion by weight of the total of all materials charged to the reaction zone.

Certain of the additional materials which may be used perform functions which offer significant advantages over the process as performed with only the carbo-metallic oil and catalyst. Among these functions are: controlling the effects of heavy metals and other catalyst contaminants; enhancing catalyst activity; absorbing excess heat in the catalyst as received from the regenerator; disposal of pollutants or conversion thereof to a form or forms in which they may be more readily separated from products and/or disposed of; controlling catalyst temperature; diluting the carbo-metallic oil vapors to reduce their partial pressure and increase the yield of desired products; adjusting feed/catalyst contact time; donation of hydrogen to a hydrogen deficient carbo-metallic oil feedstock; assisting in the dispersion of the feed; and possibly also distillation of products. Certain of the metals in the heavy metals accumulation on the catalyst are more active in promoting undesired reactions when they are in the form of elemental metal, than they are when in the oxidized form produced by contact with oxygen in the catalyst regenerator. However, the time of contact between catalyst and vapors of feed and product in past conventional catalytic cracking was sufficient so that hydrogen released in the cracking reaction was able to reconvert a significant portion of the less harmful oxides back to the more harmful elemental heavy metals. One can take advantage of this situation through the introduction of additional materials which are gaseous (including vaporous) form in the reaction zone in admixture with the catalyst and vapors of feed and products. The increased volume of material in the reaction zone resulting from the presence of such additional materials tends to increase the velocity of flow through the reaction zone with a corresponding decrease in the residence time of the catalyst and oxidized heavy metals borne thereby. Because of this reduced residence time, there is less opportunity for reduction of the oxidized heavy metals to elemental form and therefore less of the harmful elemental metals are available for contacting the feed and products.

Added materials may be introduced into the process in any suitable fashion, some examples of which follow. For instance, they may be admixed with the carbo-metallic oil feedstock prior to contact of the latter with the catalyst. Alternatively, the added materials may, if desired, be admixed with the catalyst prior to contact of the latter with the feedstock. Separate portions of the added materials may be separately admixed with both catalyst and carbo-metallic oil. Moreover, the feedstock, catalyst and additional materials may, if desired, be brought together substantially simultaneously. A portion of the added materials may be mixed with catalyst and/or carbo-metallic oil in any of the above described ways, while additional portions are subsequently brought into admixture. For example, a portion of the added materials may be added to the carbo-metallic oil and/or to the catalyst before they reach the reaction zone, while another portion of the added materials is introduced directly into the reaction zone. The added materials may be introduced at a plurality of spaced locations in the reaction zone or along the length thereof, if elongated.

The amount of additional materials which may be present in the feed, catalyst or reaction zone for carrying out the above functions, and others, may be varied as desired; but said amount will preferably be sufficient to substantially heat balance the process. These materials may for example be introduced into the reaction zone in a weight ratio relative to feed of up to about 0.4, preferably in the range of about 0.02 to about 0.4, more preferably about 0.03 and most preferably about 0.05 to about 0.25.

For example, many or all of the above desirable functions may be attained by introducing H₂O to the reaction zone in the form of steam or of liquid water or a combination thereof in a weight ratio relative to feed in the range of about 0.04 or more, or more preferably about 0.05 to about 0.1 or more. Without wishing to be bound by any theory, it appears that the use of H₂O tends to inhibit reduction of catalyst-borne oxides, sulfites and sulfides to the free metallic form which is believed to promote condensation-dehydrogenation with consequent promotion of coke and hydrogen yield and accompanying loss of product. Moreover, H₂O may also, to some extent, reduce deposition of metals onto the catalyst surface. There may also be some tendency to desorb nitrogen-containing molecules from the surface of the catalyst particles, or at lease some tendency to inhibit their absorption by the catalyst. It is also believed that added H₂O tends to increase the acidity of the catalyst by Bronsted acid formation which in turn enhances the activity of the catalyst. Assuming the $H_2O$ as supplied is cooler than the regenerated catalyst and/or the temperature of the reaction zone, the sensible heat involved in raising the temperature of the $H_2O$ upon contacting the catalyst in the reaction zone or elsewhere can absorb excess heat from the catalyst. Where the $H_2O$ is or includes recycled water that contains for example about 500 to about 5000 ppm of $H_2S$ dissolved therein, a number of additional advantages may accrue. The ecologically unattractive $H_2S$ need not be vented to the atmosphere, the recycled water does not require further treatment to remove $H_2S$ and the $H_2S$ may be of assistance in reducing coking of the catalyst by passivation of the heavy metals, i.e. by conversion thereof to the sulfide form which has a lesser tendency than the free metals to enhance coke and hydrogen production. In the reaction zone, the presence of $H_2O$ can dilute the carbo-metallic oil vapors, thus reducing their partial pressure and tending to increase the yield of the desired products. It has been reported that $H_2O$ is useful in combination with other materials in generating hydrogen during cracking; thus it may be able to act as a hydrogen donor for hydrogen deficient carbo-metallic oil feedstocks. The $H_2O$ may also serve certain purely mechanical functions such as: assisting in the atomizing or dispersion of the feed; competing with high molecular weight molecules for adsorption on the surface of the catalyst, thus interrupting coke formation; steam distillation of vaporizable products from unvaporized feed material; and disengagement of product from catalyst upon conclusion of the cracking reaction. It is particularly preferred to bring about $H_2O$, catalyst and carbo-metallic oil substantially simultaneously. For example, one may admix $H_2O$ and feedstock in an atomizing nozzle and immediately direct the resultant spray into contact with the catalyst at the downstream end of the reaction zone.

The addition of steam to the reaction zone is frequently mentioned in the literature of fluid catalytic cracking. Addition of liquid water to the feed is discussed relatively infrequently, compared to the introduction of steam directly into the reaction zone. However, in accordance with the present invention it is particularly preferred that liquid water be brought into intimate admixture with the carbo-metallic oil in a weight ratio of about 0./ to about 0.15 at or prior to the time of introduction of the oil into the reaction zone, whereby the water (e.g., in the form of liquid water or in the form of steam produced by vaporization of liquid water in contact with the oil) enters the reaction zone as part of the flow of feedstock which enters such zone. Although not wishing to be bound by any theory, it is believed that the foregoing is advantageous in promoting dispersion of the feedstock. Also, the heat of vaporization of the water, which heat is absorbed from the catalyst, from the feedstock, or from both, causes the water to be a more efficient heat sink than steam alone. Preferably the weight ratio of liquid water to feed is about 0.04 to about 0.1, more preferably about 0.05 to about 0.1.

Of course, the liquid water may be introduced into the process in the above described manner or in other ways, and in either event the introduction of liquid water may be accompanied by the introduction of additional amounts of water as steam into the same or different portions of the reaction zone or into the catalyst and/or feedstock. For example, the amount of additional steam may be in a weight ratio relative to feed in the range of about 0.01 to about 0.25, with the weight ratio of total $H_2O$ (as steam and liquid water) to feedstock being about 0.3 or less. The charging weight ratio of liquid water relative to steam in such combined use of liquid water and steam may thus range from about 5 to about 0.2. Such ratio may be maintained at a predetermined level within such range or varied as necessary or desired to adjust or maintain the heat balance of the reaction.

Other materials may be added to the reaction zone to perform one or more of the above described functions. For example, the dehydrogenation-condensation activity of heavy metals may be inhibited by introducing hydrogen sulfide gas into the reaction zone. Hydrogen may be made available for hydrogen deficient carbo-metallic oil feedstocks by introducing into the reaction zone either a conventional hydrogen donor diluent such as a heavy naphtha or relatively low molecular weight carbon-hydrogen fragment contributors, including for examples light paraffins; low molecular weight alcohols and other compounds which permit or favor intermolecular hydrogen transfer; and compounds that chemically combine to generate hydrogen in the reaction zone such as by reaction of carbon monoxide with water, or with alcohols, or with olefins, or with other materials or mixtures of the foregoing.

All of the above mentioned additional materials (including water), alone or in conjunction with each other or in conjuncation with other materials, such as nitrogen or other inert gases, light hydrocarbons, and others, may perform any of the above-described functions for which they are suitable, including without limitation, acting as diluents to reduce feed partial pressure and/or as heat sinks to absorb excess heat present in the catalyst as received from the regeneration step.

The foregoing is a discussion of some of the functions which can be performed by materials other than catalyst and carbo-metallic oil feedstock introduced into the reaction zone, and it should be understood that other materials may be added or other functions performed without departing from the spirit of the invention.

The invention may be practiced in a wide variety of apparatus. However, the preferred apparatus includes means for rapidly vaporizing as much feed as possible and efficiently admixing feed and catalyst (although not necessarily in that order), for causing the resultant mixture to flow as a dilute suspension in a progressive flow mode, and for separating the catalyst from cracked products and any uncracked or only partially cracked feed at the end of a predetermined residence time or times, it being preferred that all or at least a substantial portion of the product should be abruptly separated from a least a portion of the catalyst.

For example, the apparatus may include, along its elongated reaction chamber, one or more points for introduction of carbo-metallic feed, one or more points for introduction of catalyst, one or more points for introduction of additional material, one or more points of withdrawal of products and one or more points for withdrawal of catalyst. The means for introducing feed, catalyst and other materials may range from open pipes to sophisticated jets or spray nozzles, it being preferred to use means capable of breaking up the liquid feed into fine droplets. Preferably, the catalyst, liquid water (when used) and fresh feed are brought together in an apparatus similar to that disclosed in U.S. patent application Ser. No. 969,601 of George D. Myers et al, filed Dec. 14, 1978, the entire disclosure of which is hereby incorporated herein by reference.

It is preferred that the reaction chamber, or at least the major portion thereof, be more nearly vertical than horizontal and have a length to diameter ratio for at least about 10, more preferably about 20 or 25 or more. Use of a vertical riser type reactor is preferred. If tubular, the reactor can be of uniform diameter throughout or may be provided with a continuous or step-wise increase in diameter along the reaction path to maintain or vary the velocity along the flow path.

In general, the charging means (for catalyst and feed) and the reactor configuration are such as to provide a relatively high velocity of flow and dilute suspension of catalyst. For example, the vapor or catalyst velocity in the riser will be usually at least about 25 and more typically at least about 35 feet per second. This velocity may range up to about 55 or about 75 feet per second or higher. The velocity capabilities of the reactor will in general be sufficient to prevent substantial build-up of a catalyst bed in the bottom or other portions of the riser, whereby the catalyst loading in the riser can be maintained below about 4 or 5 pounds and below about 2 pounds per cubic foot, respectively, at the upstream (e.g. bottom) and downstream (e.g. top) ends of the riser.

The progressive flow mode involves, for example, flowing of catalyst, feed and products as a stream in a positively controlled and maintained direction established by the elongated nature of the reaction zone. This is not to suggest however that there must be strictly linear flow. As is well known, turbulent flow and "slippage" of catalyst may occur to some extent especially in certain ranges of vapor velocity and some catalyst loadings, although it has been reported advisable to employ sufficiently low catalyst loadings to restrict slippage and back-mixing.

Most preferably the reactor is one which abruptly separates a substantial portion or all of the vaporized cracked products from the catalyst at one or more points along the riser, and preferably separates substantially all of the vaporized cracked products from the catalyst at the downstream end of the riser. A preferred type of reactor embodies ballistic separation of catalyst and products; that is, catalyst is projected in a direction established by the riser tube, and is caused to continue its motion in the general direction so established, while the products, having lesser momentum, are caused to make an abrupt change of direction, resulting in an abrupt, substantially instantaneous separation of product from catalyst. In a preferred embodiment referred to as a vented riser, the riser tube is provided with a substantially unobstructed discharge opening at its downstream end for discharge of catalyst. An exit port in the side of the tube adjacent the downstream end receives the products. The discharge opening communicates with a catalyst flow path which extends to the usual stripper and regenerator, while the exit port communicates with a product flow path which is substantially or entirely separated from the catalyst flow path and leads to separation means for separating the products from the relatively small portion of catalyst, if any, which manages to gain entry to the product exit port. Examples of a ballistic separation apparatus and technique as above described, are found in U.S. Pat. Nos. 4,066,533 and 4,070,159 to Myers et al, the disclosures of which patents are hereby incorporated herein by reference in their entireties.

Preferred conditions for operation of the process are described below. Among these are feed, catalyst and reaction temperatures, reaction and feed pressures, residence time and levels of conversion, coke production and coke laydown on catalyst.

In conventional FCC operations with VGO, the feedstock is customarily preheated, often to temperatures significantly higher than are required to make the feed sufficiently fluid for pumping and for introduction into the reactor. For example, preheat temperatures as high as about 371° C. (about 700°) or 427° C. (800° F.) have been reported. But in our process as presently practiced it is preferred to restrict preheating of the feed, so that the feed is capable of absorbing a larger amount of heat from the catalyst while the catalyst raises the feed to conversion temperature, at the same time minimizing utilization of external fuels to heat the feedstock. Thus, where the nature of the feedstock permits, it may be fed at ambient temperature. Heavier stocks may be fed at preheat temperatures of up to about 316° C. (about 600° F.), typically about 93° C. (about 200° F.) to about 260° C. (about 500° F.), but higher preheat temperatures are not necessarily excluded.

The catalyst fed to the reactor may vary widely in temperature, for example from about 593° C. (about 1100° F.) to about 871° C. (about 1600° F.), more preferably about 649° C. (about 1200° F.) to about 815° C. (about 1500° F.) and most preferably about 704° C. (about 1300° F.) to about 760° C. (about 1400° F.), with about 718° C. (about 1325° F.) to about 746° C. (about 1375° F.) being considered optimum at present.

As indicated previously, the conversion of the carbo-metallic oil to lower molecular weight products may be conducted at a temperature of about 482° C. (about 900° F.) to about 760° C. (about 1400° F.), measured at the reaction chamber outlet. The reaction temperature as measured at said outlet is more preferably maintained in the range of about 524° C. (about 975° F.) to about 704° C. (about 1300° F.), still more preferably about 529° C. (about 985° F.) to about 649° C. (about 1200° F.), and most preferably about 538° C. (about 1000° F.) to about 621° C. (about 1150° F.). Depending upon the temperature selected and the properties of the feed, all of the feed may or may not vaporize in the riser.

Although the pressure in the reactor may, as indicated above, range from about 10 to about 50 psia, preferred and more preferred pressure ranges are about 15 to about 35 and about 20 to about 35. In general, the partial (or total) pressure of the feed may be in the range of about 3 to about 30, more preferably about 7 to about 25 and most preferably about 10 to about 17 psia. The feed partial pressure may be controlled or suppressed by the introduction of gaseous (including vaporous) materials into the reactor, such as for instance the steam, water and other additional materials described above. The process has for example been operated with the ratio of feed partial pressure relative to total pressure in the riser in the range of about 0.2 to about 0.8, more typically about 0.3 to about 0.7 and still more typically about 0.4 to about 0.6, with the ratio of added gaseous material (which may include recycled gases and/or steam resulting from introduction of H$_2$O to the riser in the form of steam and/or liquid water) relative to total pressure in the riser correspondingly ranging from about 0.8 to about 0.2, more typically about 0.7 to about 0.3 and still more typically about 0.6 to about 0.4. In the illustrative operations just described, the ratio of the partial pressure of the added gaseous material relative to the partial pressure of the feed has been in the range of about 0.25 to about 2.5, more typically about 0.4 to about 2 and still more typically about 0.7 to about 1.7.

Although the residence time of feed and product vapors in the riser may be in the range of about 0.5 to about 10 seconds, as described above, preferred and more preferred values are about 0.5 to about 6 and about 1 to about 4 seconds, with about 1.5 to about 3.0 seconds currently being considered about optimum. For example, the process has been operated with a riser vapor residence time to about 2.5 seconds or less by introduction of copious amounts of gaseous materials into the riser, such amounts being sufficient to provide for example a partial pressure ratio of added gaseous materials relative to hydrocarbon feed of about 0.8 or more. By way of further illustration, the process has been operated with said residence time being about two seconds or less, with the aforesaid ratio being in the range of about 1 to about 2. The combination of low feed partial pressure, very low residence time and ballistic separation of products from catalyst are considered especially beneficial for the conversion of carbo-metallic oils. Additional benefits may be obtained in the foregoing combination when there is a substantial partial pressure of added gaseous material, especially $H_2O$, as described above.

Depending upon whether there is slippage between the catalyst and hydrocarbon vapors in the riser, the catalyst riser residence time may or may not be the same as that of the vapors. Thus, the ratio of average catalyst reactor residence time versus reactor residence time, i.e. slippage, may be in the range of about 1 to about 5, more preferably about 1 to about 4 and most preferably about 1.2 to about 3, with about 1.2 to about 2 currently being considered optimum.

In certain types of known FCC units, there is a riser which discharges catalyst and product vapors together into an enlarged chamber, usually considered to be part of the reactor, in which the catalyst is disengaged from product and collected. Continued contact of catalyst, uncracked feed (if any) and cracked products in such enlarged chamber results in an overall catalyst feed contact time appreciably exceeding the riser tube residence times of the vapors and catalysts. When practicing the process of the present invention with ballistic separation of catalyst and vapors at the downstream (e.g. upper) extremity of the riser, such as is taught in the above mentioned Myers et al patents, the riser residence time and the catalyst contact time are substantially the same for a major portion of the feed and product vapors. It is considered advantageous if the vapor riser residence time and vapor catalyst contact time are substantially the same for at least about 80%, more preferably at least about 90% and most preferably at least about 95% by volume of the total feed and product vapors passing through the riser. By denying such vapors continued contact with catalyst in a catalyst disengagement and collection chamber one may avoid a tendency toward re-cracking and diminished selectivity.

In general, the combination of catalyst to oil ratio, temperatures, pressures and residence times should be such as to effect a substantial conversion of the carbo-metallic oil feedstock. It is an advantage of the process that very high levels of conversion can be attained in a single pass; for example the conversion may be in excess of 50% and may range to about 90% higher. Preferably the aforementioned conditions are maintained at levels sufficient to maintain conversion levels in the range of about 60 to about 90% and more preferably about 70 to about 85%. The foregoing conversion levels are calculated by subtracting from 100% the percentage obtained by dividing the liquid volume of fresh feed into 100 times the volume of liquid product boiling at and above 221° C. (430° F.) (tbp, standard atmospheric pressure).

These substantial levels of conversion may and usually do result in relatively large yields of coke, such as for example about 4 to about 14% by weight based on fresh feed, more commonly about 6 to about 12% and most frequently about 6 to about 10%. However feeds having very high carbon residue levels may produce coke yields of up to 17 wt.% or higher. The coke yield can more of less quantitatively deposit upon the catalyst. At contemplated catalyst to oil ratios, the resultant coke laydown may be in excess of about 0.3, more commonly in excess of about 0.5 and very frequently in excess of about 1% of coke by weight, based on the weight of moisture free regenerated catalyst. Such coke laydown may range as high as about 2%, or about 3%, or even higher.

In common with conventional FCC operations on VGO, the present process includes stripping of spent catalyst after disengagement of the catalyst from product vapors. Persons skilled in the art are acquainted with appropriate stripping agents and conditions for stripping spent catalyst, but in some cases the present process may require somewhat more severe conditions than are commonly employed. This may result, for example, from the use of a carbo-metallic oil having constituents which do not volatilize under the conditions prevailing in the reactor, which constituents deposit themselves at least in part on the catalyst. Such adsorbed, unvaporized material can be troublesome from at least two standpoints. First, if the gases (including vapors) used to strip the catalyst can gain admission to a catalyst disengagement or collection chamber connected to the downstream end of the riser, and if there is an accumulation of catalyst in such chamber, vaporization of these unvaporized hydrocarbons in the stripper can be followed by adsorption on the bed of catalyst in the chamber. More particularly, as the catalyst in the stripper is stripped of adsorbed feed material, the resultant feed material vapors pass through the bed of catalyst accumulated in the catalyst collection and/or disengagement chamber and may deposit coke and/or condensed material on the catalyst in said bed. As the catalyst bearing such deposits moves from the bed and into the stripper and from thence to the regenerator, the condensed products can crate a demand for more stripping capacity, while the coke can tend to increase regeneration temperatures and/or demand greater regeneration capacity. For the foregoing reasons, it is preferred to prevent or restrict contact between stripping vapors and catalyst accumulations in the catalyst disengagement or collection chamber. This may be done for example by preventing such accumulations from forming, e.g. with the exception of a quantity of catalyst which essentially drops out of circulation and may remain at the bottom of the disengagement and/or collection chamber, the catalyst that is in circulation may be removed from said chamber promptly upon settling to the bottom of the chamber. Also, to minimize regeneration temperatures and demand for regeneration capacity, it may be desirable to employ conditions of time, temperature and atmosphere in the stripper which are sufficient to reduce potentially volatile hydrocarbon material borne by the stripped catalyst to about 10% or less by weight of the total carbon loading on the catalyst. Such stripping may for example include reheating of the catalyst, extensive stripping with steam, the use of gases having a temperature considered higher than normal for FCC/VGO operations, such as for instance flue gas from the regenerator, as well as other refinery stream gases such as hydrotreater off-gas (H₂S containing), hydrogen and others. For example, the stripper may be operated at a temperature of about 552° C. (about 1025° F.) or higher.

Substantial conversion of carbo-metallic oils to lighter products in accordance with the invention tends to produce sufficiently large coke yields and coke laydown on catalyst to require some care in catalyst regeneration. In order to maintain adequate activity in zeolite and non-zeolite catalysts, it is desirable to regenerate the catalyst under conditions of time, temperature and atmosphere sufficient to reduce the percent by weight of carbon remaining on the catalyst to about 0.25% or less, whether the catalyst bears a large heavy metals accumulation or not. Preferably this weight percentage is about 0.1% or less and more preferably about 0.05% or less, especially with zeolite catalysts. The amounts of coke which must therefore be burned off of the catalysts when processing carbo-metallic oils are usually substantially greater than would be the case when cracking VGO. The term coke when used to describe the present invention, should be understood to include any residual unvaporized feed or cracking product, if any such material is present on the catalyst after stripping.

Regeneration of catalyst, burning away of coke deposited on the catalyst during the conversion of the feed, may be performed at any suitable temperature in the range of about 593° C. (about 1100° F.) to about 871° C. (about 1600° F.), measured at the regenerator catalyst outlet. This temperature is preferably in the range of about 649° C. (about 1200° F.) to about 815° C. (about 1500° F.), more preferably about 690° C. (1275° F.) to about 774° C. (1425° F.) and optimally about 718° C. (1325° F.) to about 746° C. (1375° F.). The process has been operated, for example, with a fluidized regenerator with the temperature of the catalyst dense phase in the range of about 704° C. (1300° F.) to about 760° C. (1400° F.).

TABLE IV

| CO₂/CO Ratio | Heat Of Combustion BTU/lb Coke Percent Hydrogen | | |
|---|---|---|---|
| | 2 | 4 | 6 |
| 0.5 | 8362 | 9472 | 10582 |
| 1.0 | | 11038 | 12083 |
| 3.0 | | | 14446 |
| 4.0 | 12912 | | 14894 |

The heat of combustion depends upon the concentration of hydrogen in the coke (carbonaceous deposit) and the rates of CO₂/CO in the combustion products. Carbon produces 13,910 BTU per pound when burned to CO₂ and only 3962 BTU per pound when burned to CO. Hydrogen produces 61,485 BTU per pound when burned to form water. The heats of combustion of coke for three different levels of hydrogen and four different ratios of CO₂/CO are provided in the Table IV above.

When regenerating catalyst to very low levels of carbon on regenerated catalyst, e.g. about 0.1% or less or about 0.05% or less, based on the weight of regenerated catalyst, it is acceptable to burn off at least about the last 10% or at least about the last 5% by weight of coke (based on the total weight of coke on the catalyst immediately prior to regeneration) in contact with combustion producing gases containing excess oxygen. In this connection it is contemplated that some selected portion of the coke, ranging from all of the coke down to about the last 5 or 10% by weight, can be burned with excess oxygen. By excess oxygen is meant an amount in excess of the stoichimetric requirement for burning all of the hydrogen, all of the carbon and all of the other combustible components, if any, which are present in the above-mentioned selected portion of the coke immediately prior to regeneration. The gaseous products of combustion conducted in the presence of excess oxygen will normally include an appreciable amount of free oxygen. Such free oxygen, unless removed from the by-product gases or converted to some other form by a means or process other than regeneration, will normally manifest itself as free oxygen in the flue gas from the regenerator unit. In order to provide sufficient driving force to complete the combustion of coke to low levels, when burning all or a major portion of the coke with excess oxygen, the amount of free oxygen will normally be not merely appreciable but substantial, i.e. there will be a concentration of at least about 2 mole percent of free oxygen in the total regeneration flue gas recovered from the entire, completed regeneration operations. While such technique is effective in attaining the desired low levels of carbon on regenerated catalyst, it has its limitations and difficulties as will become apparent from the discussion below.

As conventionally practiced, the burning of coke during regeneration produces some H₂O because of the small amount of hydrogen normally found in coke; but carbon monoxide and carbon dioxide are generally regarded as the principal products. The conversion of the carbon content of coke to carbon monoxide and carbon dioxide are highly exothermic reactions. For instance the reaction of oxygen with coke to produce carbon dioxide produces 14,108 BTUs per pound of coke, while the reaction of oxygen with coke or carbon to form carbon monoxide produces approximately 3967 BTUs per pound of coke. The larger the amount of coke which must be burned from a given weight of catalyst, the greater the amount of heat released during combustion in the regenerator.

Heat released by combustion of coke in the regenerator is absorbed by the catalyst and can be readily retained thereby until the regenerated catalyst is brought into contact with fresh feed. When processing carbo-metallic oils to the relatively high levels of conversion involved in the present invention, the amount of regenerator heat which is transmitted to fresh feed by way of recycling regenerated catalyst can substantially exceed the level of heat input which is appropriate in the riser for heating and vaporizing the feed and other materials, for supplying the endothermic heat of reaction for cracking, for making up the heat losses of the unit and so forth. Thus, in accordance with the invention, the amount of regenerator heat transmitted to fresh feed may be controlled, or restricted where necessary, within certain approximate ranges. The amount of heat so transmitted may for example be in the range of about 500 to about 1200, more particularly about 600 to about 900, and more particularly about 650 to about 850 BTUs per pound of fresh feed. The aforesaid ranges refer to the combined heat, in BTUs per pound of fresh feed, which is transmitted by the catalyst to the feed and reaction products (between the contacting of feed with catalyst and the separation of product from catalyst) for supplying the heat of reaction (e.g. for cracking) and the difference in enthalpy between the products and the fresh feed. Not included in the foregoing are the heat made available in the reactor by the adsorption of coke on the catalyst, nor the heat consumed by heating, vaporizing or reacting recycle streams and such added materials as water, steam, naphtha and other hydrogen donors, flue gases and inert gases, or by radiation and other losses.

One or a combination of techniques may be utilized in this invention for controlling or restricting the amount of regeneration heat transmitted via catalyst to fresh feed. For example, one may add a combustion promoter to the cracking catalyst in order to reduce the temperature of combustion of coke to carbon dioxide and/or carbon monoxide in the regenerator. Moreover, one may remove heat from the catalyst through heat exchange means, including for example heat exchangers (e.g. steam coils) built into the regenerator itself, whereby one may extract heat from the catalyst during regeneration. Heat exchangers can be built into catalyst transfer lines, such as for instance the catalyst return line from the regenerator to the reactors, whereby heat may be removed from the catalyst after it is regenerated. The amount of heat imparted to the catalyst in the regenerator may be restricted by reducing the amount of insulation on the regenerator to permit some heat loss to the surrounding atmosphere, especially if feeds of exceedingly high coking potential are planned for processing; in general, such loss of heat to the atmosphere is considered economically less desirable than certain of the other alternatives set forth herein. one may also inject cooling fluids into the regenerator, for example water and/or steam, whereby the amount of inert gas available in the regenerator for heat adsorption and removal is increased.

Another suitable and preferred technique for controlling or restricting the heat transmitted to fresh feed via recycled regenerated catalyst involves maintaining a specified ratio between the carbon dioxide and carbon monoxide formed in the regenerator while such gases are in heat exchange contact or relationship with catalyst undergoing regeneration. In general, all or a major portion by weight of the coke present on the catalyst immediately prior to regeneration is removed in at least one combustion zone in which the aforesaid ratio is controlled as described below. More particularly, at least the major portion more preferably at least about 65% and more preferably at least about 80% by weight of the coke on the catalyst is removed in a combustion zone in which the molar ratio of $CO_2$ to $CO$ is maintained at a level substantially below 5, e.g. about 4 or less. Looking at the $CO_2/CO$ relationship from the inverse standpoint, it is preferred that the $CO/CO_2$ molar ratio should be at least about 0.25 and preferably at least about 0.3 and still more preferably about 1 or more or even 1.5 or more. While persons skilled in the art are aware of techniques for inhibiting the burning of $CO$ to $CO_2$, it has been suggested that the mole ratio of $CO:CO_2$ should be kept less than 0.2 when regenerating catalyst with large heavy metal accumulations resulting from the processing of carbo-metallic oils; in this connection see for example U.S. Pat. No. 4,162,213 to Zrinscak, Sr. et al, in this invention however, maximizing CO production while regenerating catalyst to about 0.1% carbon or less, and preferably about 0.05% carbon or less, is a particularly preferred embodiment of this invention. Moreover, according to a preferred method of carrying out the invention the sub-process of regeneration, as a whole, may be carried out to the above-mentioned low levels of carbon on regenerated catalyst with a deficiency of oxygen; more specifically, the total oxygen supplied to the one or more stages of regeneration can be and preferably is less than the stoichiometric amount which would be required to burn all hydrogen in the coke to $H_2O$ and to burn all carbon in the coke to $CO_2$. If the coke includes other combustibles, the aforementioned stoichiometric amount can be adjusted to include the amount of oxygen required to burn them.

Still another particularly preferred technique for controlling or restricting the regeneration heat imparted to fresh feed via recycled catalyst involves the diversion of a portion of the heat borne by recycled catalyst to added materials introduced into the reactor, such as the water, steam, naphtha, other hydrogen donors, flue gases, inert gases, and other gaseous or vaporizable materials which may be introduced into the reactor.

The larger the amount of coke which must be burned from a given weight of catalyst, the greater the potential for exposing the catalyst to excessive temperatures. Many otherwise desirable and useful cracking catalysts are particularly susceptible to deactivation at high temperatures, and among these are quite a few of the costly molecular sieve or zeolite types of catalyst. The crystal structures of zeolites and the pore structures of the catalyst carriers generally are somewhat susceptible to thermal and/or hydrothermal degradation. The use of such catalysts in catalytic conversion processes for carbo-metallic feeds creates a need for regeneration techniques which will not destroy the catalyst by exposure to highly severe temperatures and steaming. Such need can be met by a multi-stage regeneration process which includes conveying spent catalyst into a first regeneration zone and introducing oxidizing gas thereto. The amount of oxidizing gas that enters said first zone and the concentration of oxygen or oxygen bearing gas therein are sufficient for only partially effecting the desired conversion of coke on the catalyst to carbon oxide gases. The partially regenerated catalyst is then removed from the first regeneration zone and is conveyed to a second regeneration zone. Oxidizing gas is introduced into the second regeneration zone to provide a higher concentration of oxygen or oxygen-containing gas than in the first zone, to complete the removal of carbon to the desired level. The regenerated catalyst may then be removed from the second zone and recycled to the reactor for contact with fresh feed. An example of such multi-stage regeneration process is described in U.S. patent application Ser. No. 969,602, now abandoned of George D. Myers et al, filed Dec. 14, 1978, the entire disclosure of which is hereby incorporated herein by reference. Another example may be found in U.S. Pat. No. 2,938,739.

Multi-stage regeneration offers the possibility of combining oxygen deficient regeneration with the control of the $CO:CO_2$ molar ratio. Thus, about 50% or more, more preferably about 65% to about 95%, and more preferably about 80% to about 95% by weight of the coke on the catalyst immediately prior to regeneration may be removed in one or more stages of regeneration in which the molar ration of $CO:CO_2$ is controlled in the manner described above. In combination with the foregoing, the last 5% or more, or 10% or more by weight of the coke originally present, up to the entire amount of coke remaining after the preceding stage or stages, can be removed in a subsequent stage of regeneration in which more oxygen is present. Such process is susceptible of operation in such a manner that the total flue gas recovered from the entire, completed regeneration operation contains little or no excess oxygen, i.e. on the order of about 0.2 mole percent or less, or as low as about 0.1 mole percent or less, which is substantially less than the 2 mole percent which has been suggested elsewhere. Thus, multi-stage regeneration is particularly beneficial in that it provides another convenient technique for restricting regeneration heat transmitted to fresh feed via regenerated catalyst and/or reducing the potential for thermal deactivation, while simultaneously affording an opportunity to reduce the carbon level on regenerated catalyst to those very low percentages (e.g. about 0.1% or less) which particularly enhance catalyst activity. Moreover, where the regeneration conditions, e.g. temperature or atmosphere, are substantially less severe in the second zone than in the first zone (e.g. by at least about 10° and preferably at least about $-07°$ C. (20° F.)), that part of the regeneration sequence which involves the most severe conditions is performed while there is still an appreciable amount of coke on the catalyst. Such operation may provide some protection of the catalyst from the more severe conditions. A particularly preferred embodiment of the invention is two-stage fluidized regeneration at a maximum temperature of about 815° C. (1500° F.) with a reduced temperature of at least about $-12°$ or $-07°$ C. (10° or 20° F.) in the dense phase of the second stage as compared to the dense phase of the first stage, and with reduction of carbon on catalyst to about 0.05% or less or even about 0.025% or less by weight in the second zone. In fact, catalyst can readily be regenerated to carbon levels as low as 0.01% by this technique, even though the carbon on catalyst prior to regeneration is as much as about 1%.

In most circumstances, it will be important to insure that no adsorbed oxygen containing gases are carried into the riser by recycled catalyst. Thus, whenever such action is considered necessary, the catalyst discharged from the regenerator may be stripped with appropriate stripping gases to remove oxygen containing gases. Such stripping may for instance be conducted at relatively high temperatures, for example about 732° C. (1350° F.), using steam, nitrogen or other inert gas as the stripping gas(es). The use of nitrogen and other inert gases is beneficial from the standpoint of avoiding a tendency toward hydro-thermal catalyst deactivation which may result from the use of steam.

The following comments and discussion relating to metals management, carbon management and heat management may be of assistance in obtaining best results when operating the invention. Since these remarks are for the most part directed to what is considered the best modes of operation, it should be apparent that the invention is not limited to the particular modes of operation discussed below. Moreover, since certain of these comments are necessarily based on theoretical considerations, there is no intention to be bound by any such theory, whether expressed herein or implicit in the operating suggestions set forth hereinafter.

Although discussed separately below, it is readily apparent that metals management, carbon management and heat management are inter-related and interdependent subjects both in theory and practice. While coke yield and coke laydown on catalyst are primarily the result of the relatively large quantities of coke precursors found in carbo-metallic oils, the production of coke is exacerbated by high metals accumulations, which can also significantly affect catalyst performance. Moreover, the degree of success experienced in metals management and carbon management will have a direct influence on the extent to which heat management is necessary. Moreover, some of the steps taken in support of metals management have proved very helpful in respect to carbon and heat management.

As noted preciously the presence of a large heavy metals accumulation on the catalyst tends to aggravate the problem of dehydrogenation and aromatic condensation, resulting in increased production of gases and coke for a feedstock of a given Ramsbottom carbon value. The introduction of substantial quantities of $H_2O$ into the reactor, either in the form of steam or liquid water, appears highly beneficial from the standpoint of keeping the heavy metals in a less harmful form, i.e. the oxide rather than metallic form. This is of assistance in maintaining the desired selectivity.

Also, a unit design in which system components and residence times are selected to reduce the ratio of catalyst reactor residence time relative to catalyst regenerator residence time will tend to reduce the ratio of the times during which the catalyst is respectively under reduction conditions and oxidation conditions. This too can assist in maintaining desired levels of selectivity.

Whether the metals content of the catalyst is being managed successfully may be observed by monitoring the total hydrogen plus methane produced in the reactor and/or the ratio is hydrogen to methane thus produced. In general, it is considered that the hydrogen to methane ole ratio should be less than about 1 and preferably about 0.6 or less, with about 0.4 or less being considered about optimum.

Careful carbon management can improve both selectivity, (the ability to maximize production of valuable products) and heat productivity. In general, the techniques of metals control described above are also of assistance in carbon management. The usefulness of water addition in respect to carbon management has already been spelled out in considerable detail in that part of the specification which relates to added materials for introduction into the reaction zone. In general, those techniques which improve dispersion of the feed in the reaction zone should also prove helpful; these include for instance the use of fogging or misting devices to assist in dispersing the feed.

Catalyst to oil ratio is also a factor in heat management. In common with prior FCC practice on VGO, the reactor temperature may be controlled in the practice of the present invention by respectively increasing or decreasing the flow of hot regenerated catalyst to the reactor in response to decreases and increases in reactor temperature, typically the outlet temperature in the case of a riser type reactor. Where the automatic controller for catalyst introduction is set to maintain an excessive catalyst to oil ratio, one can expect unnecessarily large rates of carbon production and heat release, relative to the weight of fresh feed charged to the reaction zone.

Relatively high reactor temperatures are also beneficial from the standpoint of carbon management. Such higher temperatures foster more complete vaporization of feed and disengagement of product from catalyst.

Carbon management can also be facilitated by suitable restriction of the total pressure in the reactor and the partial pressure of the feed. In general, at a given level of conversion, relatively small decreases in the aforementioned pressures can substantially reduce coke production. This may be due to the fact that restricting total pressure tends to enhance vaporization of high boiling components of the feed, encourage cracking and facilitate disengagement of both unconverted feed and higher boiling cracked products from the catalyst. It may be of assistance in this regard to restrict the pressure drop of equipment downstream of and in communication with the reactor. But if it is desired or necessary to operate the system at higher total pressure, such as for instance because of operating limitations (e.g. pressure drop in downstream equipment) the above described benefits may be obtained by restricting the feed partial pressure. Suitable ranges for total reactor pressure and feed partial pressure have been set forth above, and in general it is desirable to attempt to minimize the pressures within these ranges.

The abrupt separation of catalyst from product vapors and unconverted feed (if any) is also of great assistance. It is for this reason that the so-called vented riser apparatus and technique disclosed in U.S. Pat. Nos. 4,070,159 and 4,066,533 to George D. Myers et al is the preferred type of apparatus for conducting this process. For similar reasons, it is beneficial to reduce insofar as possible the elapsed time between separation of catalyst from product vapors and the commencement of stripping. The vented riser and prompt stripping tend to reduce the opportunity for coking the unconverted feed and higher boiling cracked products adsorbed on the catalyst.

A particularly diserable mode of operation from the standpoint of carbon management is to operate the process in the vented riser using a hydrogen donor if necessary, while maintaining the feed partial pressure and total reactor pressure as low as possible, and incorporating relatively large amounts of water, steam and if desired, other diluents, which provide the numerous benefits discussed in greater detail above. Moreover, when liquid water, steam, hydrogen donors, hydrogen and other gaseous or vaporizable materials are fed to the reaction zone, the feeding of these materials provides an opportunity for exercising additional control over catalyst to oil ratio. Thus, for example, the practice of increasing or decreasing the catalyst to oil ratio for a given amount of decrease or increase in reactor temperature may be reduced or eliminated by substituting either appropriate reduction or increase in the charging ratios of the water, steam and other gaseous or vaporizable material, or an appropriate reduction or increase in the ratio of water to steam and/or other gaseous materials introduced into the reaction zone.

Heat management includes measures taken to control the amount of heat released in various parts of the process and/or for dealing successfully with such heat as may be released. Unlike conventional FCC practice using VGO, wherein it is usually a problem to generate sufficient heat during regeneration to heat balance the reactor, the processing of carbo-metallic oils generally produces so much heat as to require careful management thereof.

Heat management can be facilitated by various techniques associated with the materials introduced into the reactor. Thus, heat adsorption by feed can be maximized by minimum preheating of feed, it being necessary only that the feed temperature be high enough so that it is sufficiently fluid for successful pumping and dispersion in the reactor. When the catalyst is maintained in a highly active state with the suppression of coking (metals control), so as to achieve higher conversion, the resultant higher conversion and greater selectivity can increase the heat absorption of the reaction. In general, higher reactor temperatures promote catalyst conversion activity in the face of more refractory and higher boiling constituents with high coking potentials. While the rate of catalyst deactivation may thus be increased, the higher temperature of operation tends to offset this loss in activity. Higher temperatures in the reactor also contribute to enhancement of octane number, thus off-setting the octane depressant effect of high carbon lay down. Other techniques for absorbing heat have also been discussed above in connection with the introduction of water, steam, and other gaseous or vaporizable materials into the reactor.

The severe stripping and various regeneration techniques discussed above are useful in controlling heat release in the regenerator. While removal of heat from catalyst in or downstream of the regenerator by means of heat exchangers (including steam coils) has been suggested as a means for controlling heat release, the above described techniques of multi-stage regeneration and control over the $CO/CO_2$ ratio (in either single or multi-stage regeneration) are considered more advantageous. The use of steam coils is considered to be partly self-defeating, in that a steam coil or heat exchanger in the regenerator or catalyst return line will generally cause an increase in the catalyst to oil ratio with a resultant increase in the rates of carbon production in the reactor and heat release in the regenerator.

As noted above, the invention can be practiced in the above described modes and many others. Two illustrative, non-limiting examples are described by the accompanying schematic diagrams in FIGS. 1 and 2 and by the descriptions of those figures which follow.

FIG. 1 is a schematic diagram of an apparatus for carrying out the process of the present invention. The carbo-metallic oil feed (which may have been heated in a feed preheater not shown) and water (when used) supplied through delivery pipe 9, are fed by feed supply pipe 10 having a control valve 11 to a wye 12 in which they mix with a flow of catalyst delivered through supply pipe 13 and controlled by valve 14. Of course a variety of mixing arrangements may be employed, and provisions may be made for introducing the other added materials discussed above. The mixture of catalyst and feed, with or without such additional materials, is then introduced into riser 18.

Although riser 18 appears vertical in the drawing, persons skilled in the art will recognize that the riser need not be vertical, as riser type reactors are known in which an appreciable portion of the riser pipe is non-vertical. Thus riser pipes having an upward component of direction are contemplated, and usually the upward component of their upwardly flowing inclined portions is substantial, i.e. at least about $-1°$ C. (30° F.). It is also known to provide risers which have downwardly flowing inclined or vertical portions, as well as horizontal portions. Folded risers are also known, in which there are both upwardly extending and downwardly extending segments. Moreover, it is entirely feasible to practice the process of the invention in an inclined and/or vertical pipe in which the feed and catalyst are introduced at an upper elevation and in which the feed and catalyst moves under the influence of gravity and the down flow of the feed to a lower elevation. Thus, in general, the invention contemplates the use of reaction chambers having a long L/D ratio and having a significant deviation from horizontal.

At the upper end of the riser 18 is a chamber 19 which receives the catalyst from the riser. While chamber 19 may be conventional disengagement and collection chamber, it is preferred that means be provided for causing product vapors to undergo a sufficient change of direction relative to the direction traveled by the catalyst particles, whereby the vapors are suddenly and effectively separated from the catalyst. Preferably, there is "ballistic" separation of catalyst particles and product vapors as described above.

In the present schematic diagram, the disengagement chamber 19 includes an upward extension 20 of riser pipe 18 having an open top 21 through which the catalyst particles are discharged. This embodiment makes use of the so-called vented riser described in the above-mentioned Myers et al patents. Because of the refractory nature of carbo-metallic fractions, relatively high severity is required, but the rapid disengagement of catalyst from lighter cracked products in the vented riser prevents overcracking of desirable liquid products such as gasoline to gaseous products. The product vapors are caused to undergo a sudden change of direction into lateral port 22 in the side of riser extension 20, the catalyst particle being, for the most part, unable to follow the product vapors into port 22.

The vapors and those few particles which do manage to follow them into port 22 are transferred by cross pipe 23 to a cyclone separator 24. It is an advantage of the vented riser system shown that it can function satisfactorily with a single stage cyclone separator. However, in the present embodiment the cyclone separator 24 is employed as a first stage cyclone separator which is connected via transfer pipe 17 with optional secondary cyclone separator 25. The cyclone separator means, whether of the single or multi-stage type, separates from the product vapors those small amounts of catalyst which do enter the lateral port 22. Product vapors are discharged from disengagement chamber 19 through product discharge pipe 26.

The catalyst particles which discharge from open top 21 of riser pipe extension 20, and those catalyst particles which are discharged from the discharge legs 27 and 28 of primary and secondary cyclones 24 and 25 drop to the bottom of disengagement chamber 19. The inventory and residence time of catalyst in chamber 19 are preferably minimized. During startup those catalyst particles which are present may be kept in suspension by fluffing jets 30 supplied with steam through steam supply pipe 29. Spent catalyst spilling over from the bottom of disengagement chamber 19 passes via drop leg 31 to a stripper chamber 32 equipped with baffles 33 and steam jet 34. Any of the other stripping gases referred to above may be employed with or in place of the steam.

Carbon is burned from the surface of the catalyst in the combustor 38 which receives stripped catalyst via downcomer pipe 39 and control valve 40. Blower 41 and 42, in association with a valve and piping arrangement generally indicated by 44, supply air to combustion air jets 48 at the bottom of the combustor and to fluffing jets 49 at an elevated position. Air preheater 43, although usually unused when processing heavy hydrocarbons in accordance with the invention, may be employed when starting up the unit on VGO; then, when the unit is switched over to the carbo-metallic feed, preheater operation may be discontinued (or at least reduced). Supplemental fuel means may be provided to supply fuel through the combustion air jets 48; but such is usually unnecessary since the carbon lay down on the catalyst supplies more than enough fuel to maintain the requisite temperatures in the regeneration section. Regenerated catalyst, with most of the carbon burned off, departs the combustor through an upper outlet 50 and cross pipe 51 to a secondary chamber 52, where it is deflected into the lower portion of the chamber by a baffle 53. Although the use of two stage regeneration is contemplated, and preferred, in this particular embodiment the secondary chamber 52 was operated primarily as a separator chamber, although it can be used to remove additional carbon down to about 0.01% or less in the final stages or regeneration.

Catalyst moves in up to three different directions from the secondary chamber 52. A portion of the catalyst may be circulated back to combustor 38 via catalyst recirculation loop 55 and control valve 56 for heat control in the combustor. Some of the catalyst is entrained in the product gases, such as CO and/or $CO_2$ produced by burning the carbon on the catalyst in the combustor, and the entrained catalyst fines pass upwardly in chamber 52 to two sets of primary and secondary cyclones generally indicated by 57 and 58 which separate these catalyst fines from the combustion gases. Catalyst collected in the cyclones 57, 58 and discharged through their drop legs is directed to the bottom of chamber 52 where catalyst is kept in suspension by inert gas and/or steam jets 59 and by a baffle arrangement 54, the latter facilitating discharge of regenerated catalyst through outlet 69 to catalyst supply pipe 13 through which it is recirculated for contact with fresh feed at wyte 12, as previously described.

Combustion product gases produced by regeneration of the catalyst and separated from entrained catalyst fines by the sets 57, 58 of primary and secondary cyclones in chamber 52, discharge through effluent pipes 61, 62 and heat exchanger 60, 63. If such gases contain significant amounts of CO, they may be sent via gas supply pipe 64 to an optional furnace 65 in which the CO is burned to heat heating coil 66 connected with steam boiler 67. Additional heat may be supplied to the contents of the boilers through conduit loop 68, which circulates fluid from the boiler 67 to heat exchangers 60, 63 and back to the boiler. This is of course only one example of many possible regeneration arrangements which may be employed. The amount of heat passed from the regenerator back to the riser via regenerated catalyst may be controlled in any of the other ways described above; however it is preferred to control the relative proportions of carbon monoxide and carbon dioxide produced while the catalyst is in heat exchange relationship with the combustion gases resulting from regeneration. An example of this technique is disclosed in the particularly preferred embodiment described in FIG. 2.

Figure 2:
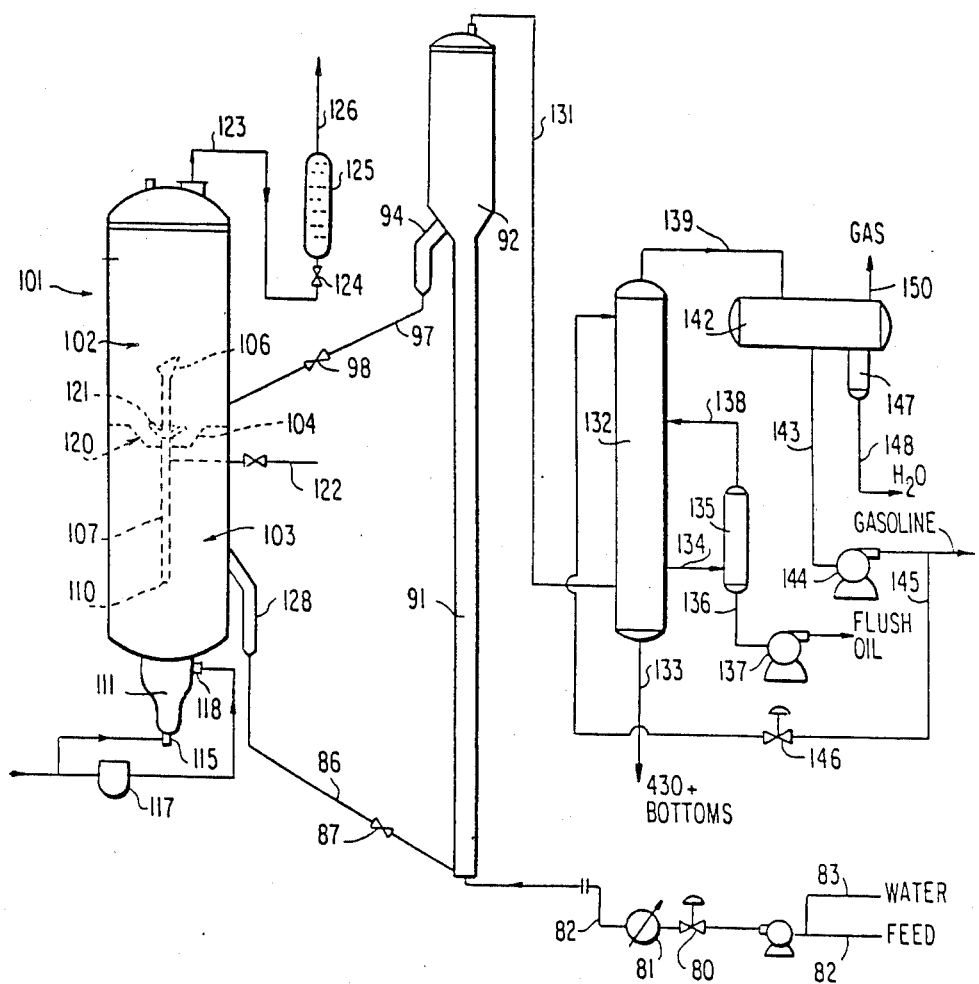
FIG. 2 is a schematic diagram of a second apparatus for carrying out the invention.

In FIG. 2 reference numeral 80 identifies a feed control valve in feedstock supply pipe 82. Supply pipe 83 (when used) introduces liquid water into the feed. Heat exchanger 81 in supply pipe 82 acts as a feed preheater, whereby preheated feed material may be delivered to the bottom of riser type reactor 91. Catalyst is delivered to the reactor through catalyst standpipe 86, the flow of catalyst being regulated by a control valve 87 and suitable automatic control equipment (not shown) with which persons skilled in the art of designing and operating riser type crackers are familiar.

The riser 91 may optionally include provision for injection of water, steam and, if desired, other gaseous and/or vaporizable material for the purpose described above. The reactor is equipped with a disengagement chamber 92 similar to the disengagement chamber 19 of the reactor shown in FIG. 1, and the FIG. 2 embodiment thus includes means for causing product vapors to undergo a change of direction for sudden and effective separation from the catalyst as in the previous embodiment. Catalyst departs disengagement chamber 92 through stripper 94 which operates in a manner similar to stripper 32 of FIG. 1. Spent catalyst passes from stripper 94 to regenerator 101 via spent catalyst transfer pipe 97 having a slide valve 98 for controlling the flow.

Regenerator 101 is divided into upper chamber 102 and lower chamber 103 by a divider panel 104 intermediate the upper and lower ends of the regenerator. The spent catalyst from transfer pipe 97 enters upper chamber 102 in which the catalyst is partially regenerated. A funnel-like collector 106 having a bias-cut upper edge receives partially regenerated catalyst from the upper surface of the dense phase of catalyst in upper chamber 102 and delivers it via drop leg 107 having an outlet 110 beneath the upper surface of the dense phase of catalyst in lower regeneration chamber 103. Instead of the internal catalyst drop leg 107, one may use an external drop leg. Valve means in such external drop leg can control the catalyst residence time and flow rate in and between the upper and lower chambers.

Air is supplied to the regenerator through an air supply pipe 113. A portion of the air travels through a branch supply pipe 114 to bayonet 115 extending upwardly in the interior of plenum 111 along its central axis. Catalyst in chamber 103 has access to the space within plenum 111 between its walls and the bayonet 115. A small bayonet (not shown) in the aforementioned space fluffs the catalyst and urges it upwardly toward a horizontally arranged ring distributor (not shown) where the open top of plenum 111 opens into chamber 103. The remainder of the air passing through air supply pipe 113 may be heated in air heater 117 (at least during start-up with VGO) and is then introduced into the inlet 118 of the aforementioned ring distributor, which may be provided with holes, nozzles or other apertures which produce an upward flow of gas to fluidize the partially regenerated catalyst in chamber 103.

The air introduced in the manner described above completes in chamber 103 the regeneration of the partially regenerated catalyst received via drop leg 107. The amount of air that is supplied is sufficient so that the air and/or the resultant combustion gases are still able to support combustion upon reaching the top of chamber 103. The aforementioned drop leg 107 extends through an enlarged aperture in panel 104, to which is secured a gas distributor 120 which is concentric with and surrounds the drop leg. Via gas distributor 120, combustion supporting gases, which have not been partially depleted of combustion supporting gas, are introduced into the upper regenerator chamber 102 where they contact for purposes of partial oxidation the incoming spent catalyst from spent catalyst transfer pipe 97. Apertured probes 121 or other suitable means in gas distributor 120 assist in achieving a uniform distribution of the partially depleted combustion supporting gas in upper chamber 102. Supplemental air or other fluids may be introduced into upper chamber 102, if desired through supply pipe 122, which discharges into or through gas distributor 120.

Fully regenerated catalyst with less than about 0.25% carbon, preferably less than about 0.1% and more preferably less than about 0.05%, is discharged from lower regenerator chamber 103 through a regenerated catalyst stripper 128, whose outlet feeds into the catalyst standpipe 86 mentioned above. Thus, regenerated catalyst is returned to riser 91 for contact with additional fresh feed from feed supply pipe 82. Whatever heat is introduced into the recycled catalyst in the regenerator 101 is available for heat transfer with the fresh feed in the riser.

The division of the regenerator into upper and lower regeneration chambers 102 and 103 not only smooths out variations in catalyst regenerator residence time but is also uniquely of assistance in restricting the quantity of regeneration heat which is imparted to the fresh feed while yielding a regenerated catalyst with low levels of residual carbon for return to the reactor. Because of the arrangement of the regenerator, the spent catalyst from transfer line 97, with its high loading of carbon, contacts in chamber 102 combustion supporting gases which have already been at least partially depleted of oxygen by the burning of carbon from partially regenerated catalyst in lower regenerator chamber 102. Because of this, it is possible to control both the combustion and the quantity of carbon dioxide produced in upper regenerator chamber 102. Although the air or other regenerating gas introduced through air supply pipe 113 and branch conduit 114 may contain a relatively large quantity of oxygen, the partially regenerated catalyst which they contact in lower regenerator chamber 103 has already had part of its carbon removed. The high concentration of oxygen and the temperature of the partially regenerated catalyst combine to rapidly remove the remaining carbon in the catalyst, thereby achieving a clean regenerated catalyst with a minimum of heat release. Thus, here again, the combustion temperature and the $CO:CO_2$ ratio in the lower regeneration chamber are therefore readily controlled. The regeneration off gases are discharged from upper regenerator chamber 102 via off gas pipe 123, regulator valve 124, catalyst fines trap 125 and outlet 126.

The vapor products from disengagement chamber 92 may be processed in any convenient manner such as for example, by discharge through vapor discharge line 131 to the inlet of fractionator 132. Said fractionator includes a bottoms outlet 133, side outlet 134, flush oil stripper 135, and stripper bottom outlet and discharge line 136 connected to pump 137 for discharging flush oil. The overhead product from stripper 135 is routed via stripper overhead return line 138 to the fractionator 132.

The main overhead discharge line 139 of the fractionator is connected to overhead receiver 142 having a bottoms discharge line 143 feeding into pump 144 for discharging gasoline product. If desired, a portion of this product may be sent via recirculation line 145, the flow being controlled by recirculation valve 146, back to the fractionator 132. The overhead receiver also includes a water receiver 147 and a water discharge line 148. The gas outlet 150 of the overhead receiver discharges a stream which is mainly below $C_5$, but containing some $C_5$, $C_6$, and $C_7$, material. If desired, the $C_5$ and above material in this gas stream may be separated by compression, cooling and fractionation and recycled to the overhead receiver with a compressor, cooler and fractionator (not shown).

sion, obtained through use of the feeds and catalysts of examples 7-10 repeated at various levels.

TABLE V

| | EXAMPLES | | | | | | | | | |
|---|---|---|---|---|---|---|---|---|---|---|
| | 1 | 2 | 3 | 4 | 5 | 6 | 7 | 8 | 9 | 10 |
| Conversion, Vol. % | 63.6 | 59.8 | 64.3 | (75.7) | (71.4) | (78.5) | 83.2 | 72.95 | 74.1 | 79.96 |
| Volume Yield | 123.6 | 111.3 | 118.1 | 118.8 | (118.2) | 111.0 | | | | |
| Gasoline | | | | | | | | | | |
| API Gravity | 54.2 | 53.0 | 52.7 | 47.7 | 60.5 | 47.8 | 42.5 | 36.9 | 37.8 | 36.3 |
| Distillation | | | | | | | | | | |
| IBP | 94 | 94 | 104 | 152 | 95 | 168 | | | | |
| 50% | 238 | 254 | 255 | 258 | 212 | 264 | | | | |
| 95% | 434 | 438 | 435 | 398 | 398 | 420 | | | | |
| RONC | 91.6 | 89.4 | 89.2 | 93.8 | 93.6 | 92.3 | 92.0 | 93.2 | 94 | 95.4 |
| MONC | 80.6 | 78.7 | 78.9 | 80.8 | 82.2 | 82.7 | 70.7 | 78.1 | 80.1 | |
| Regeneration Temp. | (1359) | 1336 | 1330 | N/A | N/A | N/A | 1283 | 1360 | 1360 | 1295 |
| Upper Regen. Temp. | N/A | N/A | N/A | 1249 | 1407 | (1290) | N/A | N/A | N/A | N/A |
| Lower Regen. Temp. | N/A | N/A | N/A | 1355 | 1422 | 1325 | N/A | N/A | N/A | N/A |
| Spent Catalyst Wt. % C | 1.67 | 1.72 | 1.72 | 1.14 | 1.63 | (1.21) | .87 | 1.49 | .94 | 2.54 |
| Regen. Catalyst % C | .43 | .53 | .53 | .01 | .01 | .01 | .17 | .53 | .17 | .73 |
| Circulating Catalyst % C | | | | .49 | .42 | .34 | | | | |
| $CO_2$ Effluent | 0 | 0 | 0 | 0 | 0 | 0 | 2.51 | 4.9 | 2.52 | 2.32 |
| $CO_2$/ CO lb./lb. | 2.67 | 2.43 | 3.19 | 5.8 | 4.7 | 3.81 | 4.43 | 18.2 | 20 | 3.84 |
| Feedstock | | | | Murb-Mex.[2] | ALB.R.C.[5] | ABL.R.C. | Murb.VGO | Murb.R.C. | Mex.R.C. | AbL.R.C. |
| Feed #/hr.[1] | (75050) | 74,478 | 72,209 | 2741.72 | (2702.4) | 2268 | 4.16 | 4.98 | 4.52 | 2.27 |
| Steam #/hr. | 4.050 | 3,840 | 3,910 | 249.2 | 188.4 | 193.0 | | | | |
| Water #/hr. | 8,210 | 9,230 | 9,380 | N/A | N/A | 96.4 | | | | |
| Catalyst | GRZ-1 | GRZ-1 | GRZ-1 | | | | Eq.SDX[4] | Eq.SDX | Eq.SDX | Eq.SDX |
| Cat/Oil Ratio | (7.8) | (7.1) | (7.9) | (7.1) | (5.8) | (9.3) | 10.32 | 8.46 | 12.35 | 12.5 |
| Riser Vapor | | | | (2.3) | 1.6 | 2.6 | | | | |
| Residence Time | | | | | | | | | | |
| Rx Temperatures | (980) | (977) | (975) | 1025 | 1002 | 980 | 1056 | 1051 | 1100 | 1055 |
| Pressure (psia) | (25) | 36.3 | 34.6 | (35.6) | (35.1) | 35.1 | | | | |
| Products | | | | | | | | | | |
| Dry Gas Wt. % | 6.1 | 4.9 | 5.6 | 5.5 | (4.9) | 4.8 | | | | |
| $C_3$ Sat. Vol. % | 3.5 | 3.2 | 2.2 | 2.7 | (3.2) | 2.7 | | | | |
| $C_3$ Olefins Vol. % | 8.9 | 5.4 | 5.9 | 9.6 | (10.5) | 9.2 | | | | |
| $C_4$ Sat. Vol. % | 3.9 | 6.8 | 3.5 | 5.9 | (7.3) | 7.0 | | | | |
| $C_4$ Olefins Vol. % | 7.1 | 7.3 | 8.3 | 10.5 | (10.8) | 9.7 | | | | |
| $C_5$-430° F. Vol. % | (43.3) | (31.4) | (42.9) | (52.1) | (45.5) | (52.0) | 53.50 | 53.44 | 46.55 | 45.85 |
| Coke Wt. % | 10.0 | 8.9 | 10.0 | 8.4 | (9.9) | 11.6 | 7.22 | 8.1 | 9.53 | 16.47 |
| Material Balance Wt. % | 105.8 | 97.4 | 102.7 | (100.7) | 98.2 | 95.1 | 98.81 | 96.7 | 99.4 | 96.6 |
| Selectivity | (.68) | (.53) | (.67) | .68 | .63 | .63 | .64 | .73 | .63 | .57 |

Fresh feed only, except that Example 3 includes recycle of 9,477 #/hr. of HCO (heavy cycle oil), having an API gravity of 18.3 and boiling at about 550 to 775, injected into the reduced crude line to the riser.
Blend of 67% Mexican and 33% Murban (by volume) reduced crudes.
The VGO described in Table 1.
Equilibrium Davison Super DX.

EXAMPLES

The following examples are given only by way of illustration and not for limiting the invention. The properties of the feedstocks and catalysts employed in the examples are set forth in Tables I and II above.

EXAMPLES 1-3

A unit constructed in accordance with FIG. 1 was operated in the manner and with the results set forth in Table III and in accordance with the teachings of FIG. I and the associated description thereof.

EXAMPLES 4-6

These examples were conducted as indicated in Table III with a unit constructed in accordance with the teachings of FIG. 2. Regeneration was carried out in two stages.

EXAMPLES 7-10

Figure 3:
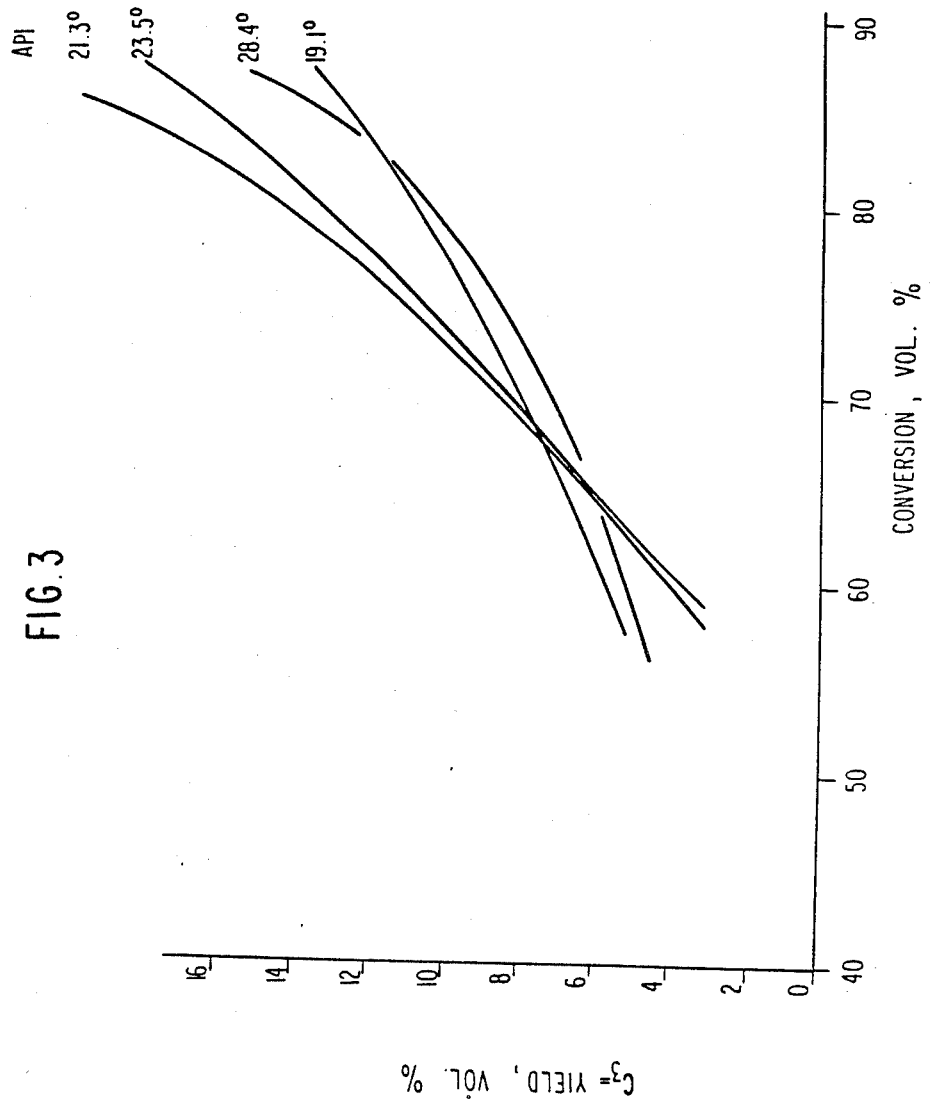
FIGS. 3 through 5 are graphs of data obtained from operating the process of the invention.
Figure 4:
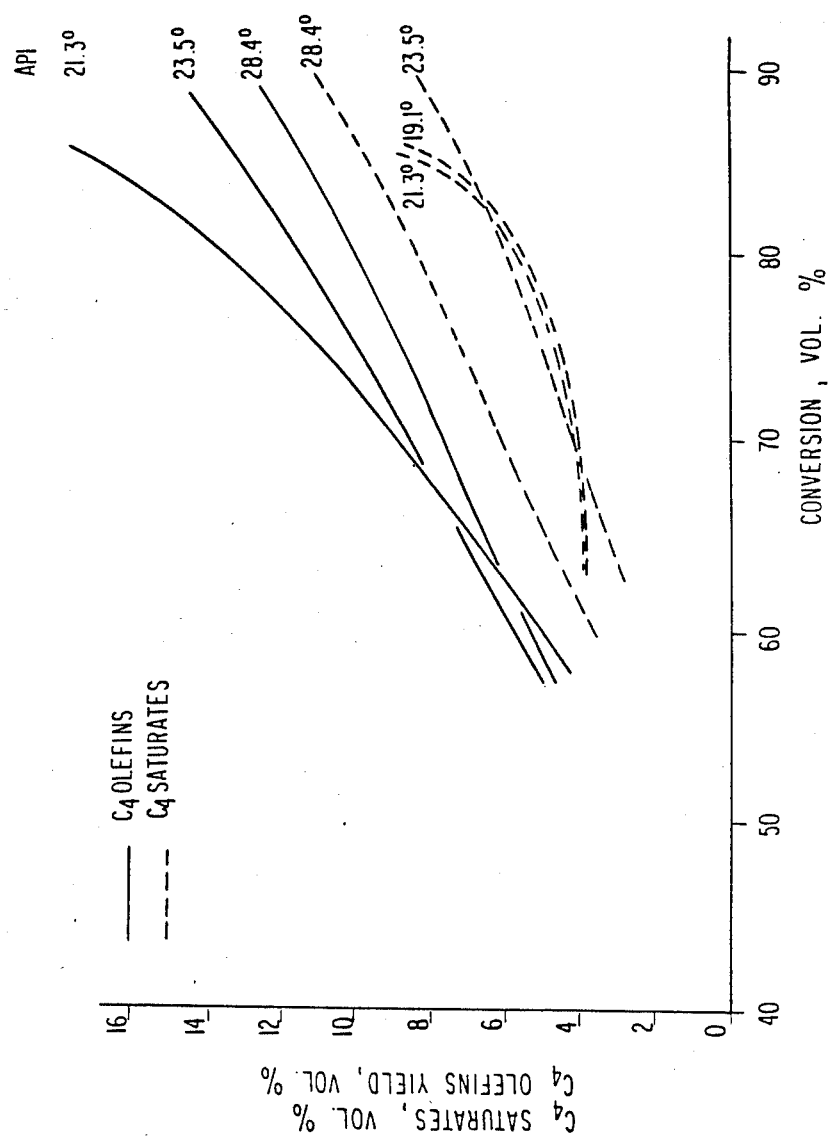
Figure 5:
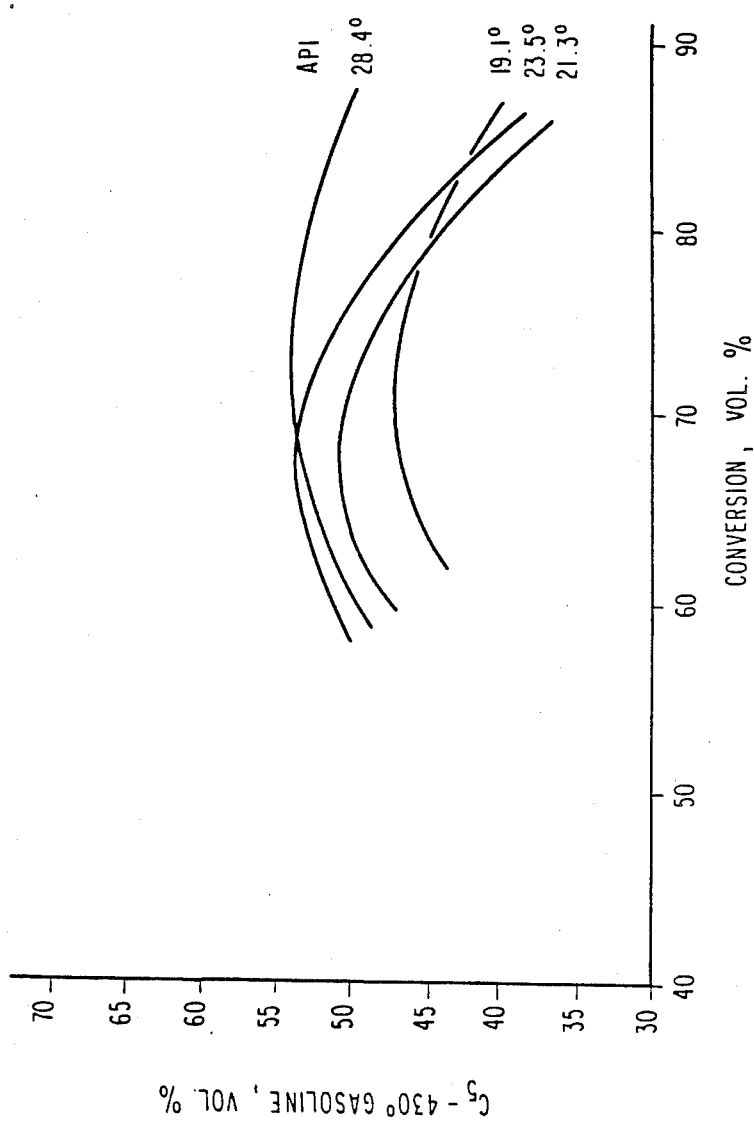

These examples were conducted in a pilot scale unit using feedstock, catalyst and operating conditions as shown in Table III. FIGS. 3-5 show the yield in volume percent of (3) $C_3$ olefins, (4) $C_4$ saturates and olefins and (5) gasoline, respectively vs. volume percent conver- The discussion herein presented is directed to methods for maintaining a desired heat balanced operation premised by a selected catalyst regeneration temperature in combination with operating parameters in balanced relationship.

Figure 6:
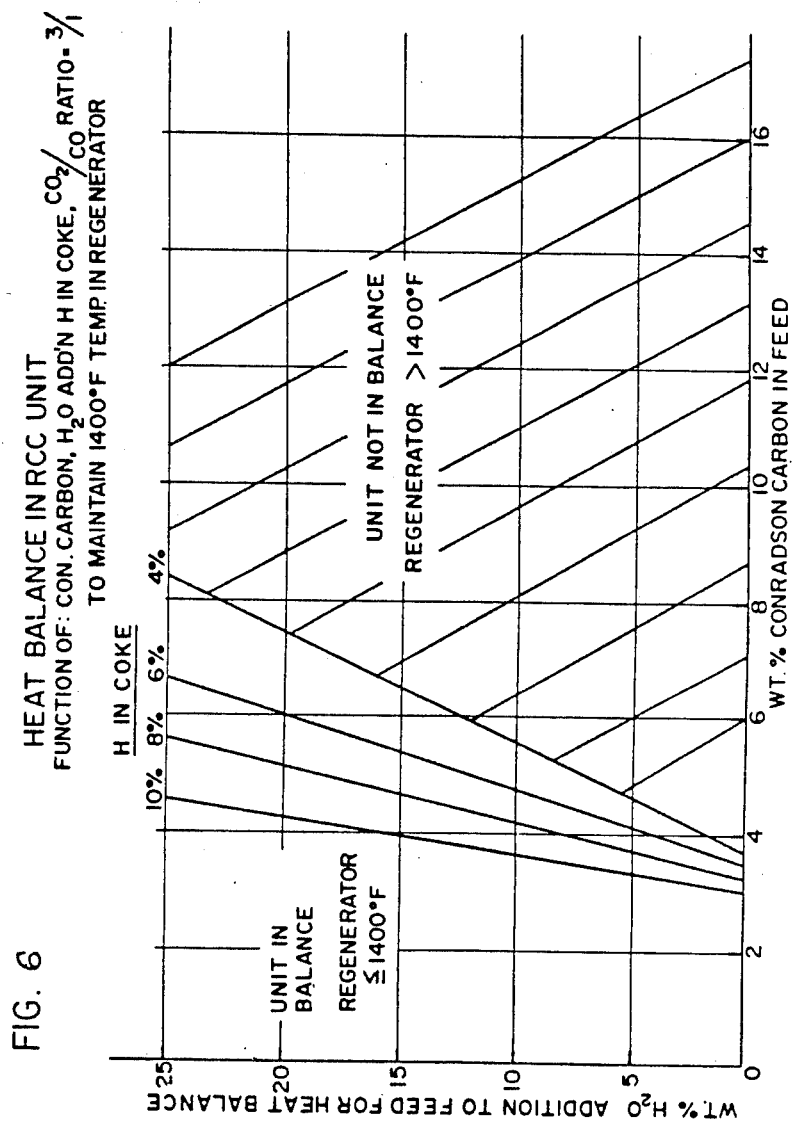
FIG. 6 is a graph depicting the effect of the functions of feed Conradson carbon, Water addition, H in coke, $CO_2/CO$ ratio=3/1 to maintain about 760° C. (about 1400° F.) regenerator temperature in a heat balanced RCC Unit operation.

FIG. 6, presented herewith graphically identifies a relationship between feed Conradson carbon, water wt.% addition, hydrogen in the deposited coke, for a premised catalyst regeneration temperature of about 760° C. (1400° F.) and obtained during catalyst regeneration by a $CO_2$/CO flue gas combustion product equal to about 3/1. FIG. 6 particularly relates these operating parameters in a catalytic cracking-regeneration operation in heat balance when the hydrogen in deposited hydrocarbonaceous material is from 4 to 10%. The relationship provided increases the water addition with increases in feed Conradson carbon for different levels of hydrogen in carbonaceous deposits. That is, for each curve of hydrogen in deposited hydrocarbonaceous material, an increase in water addition permits one to process feeds of higher Conradson carbon value.

Figure 7:
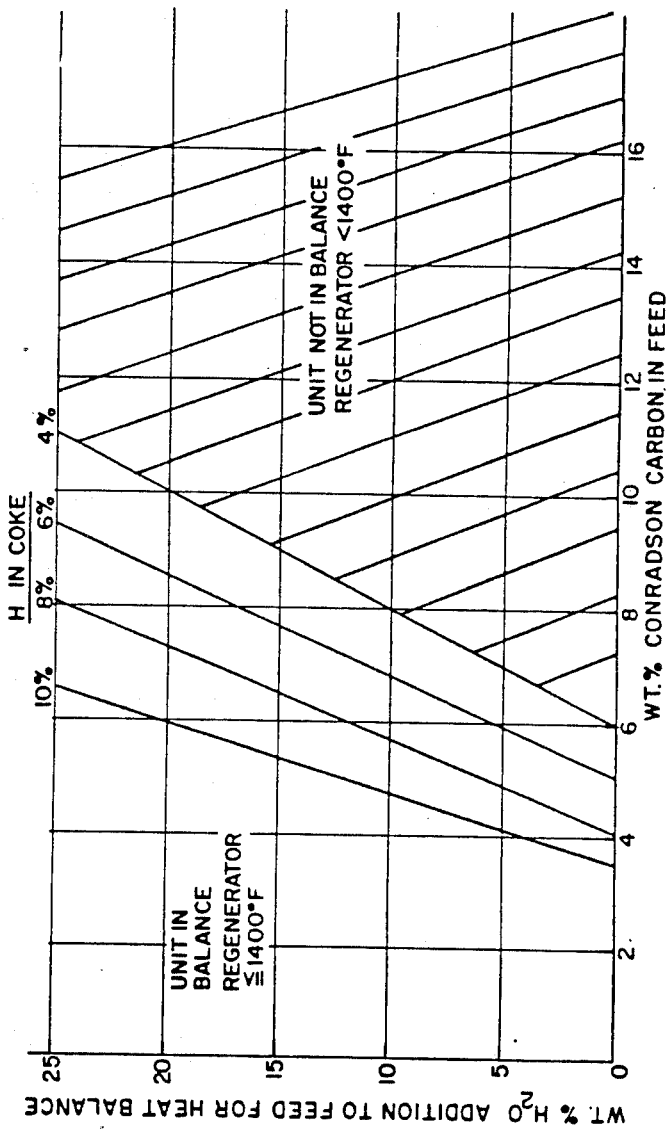
FIG. 7 is a graph depicting the effect of the functions of feed Conradson carbon, Water addition, H in coke, $CO_2/CO$ ratio=1/1 to maintain about 760° C. (about 1400° F.) regenerator temperature in a heat balance RCC Unit operation.

FIG. 7 is similar to FIG. 6 in graph represented functions but departs significantly in the relationship between these functions when restricting the regeneration flue gas to a $CO_2$/CO ratio of 1/1 instead of 3/1. That is, the relationships represented by FIG. 7 permits cracking a higher wt% Conradson carbon containing feed for a given water addition rate than that permitted by FIG. 6. For example, for a water addition of 5 wt% and a hydrogen in deposited hydrocarbonaceous material limited to 6%, as shown in FIG. 6, the feed Conradson carbon is limited to about 4 wt%. However, for the same combination of functions, FIG. 7 shows that the feed Conradson carbon may be up to 6 wt%. Thus, a lower combustion heat input to the catalyst by restricting the $CO_2/CO$ flue gas to 1/1 permits processing a higher Conradson carbon feed for a given water addition.

It is clear from a comparison of the graphs of FIGS. 6 and 7, that as more CO is converted during catalyst regeneration to $CO_2$, there is a greater heat input to the catalyst and this is compensated by the combination of low feed preheat processing feeds of low Conradson carbon and by water addition with the oil feed to maintain a desired heat balance operation at a premised regeneration temperature of 732° C. (1350° F.) or 760° C. (1400° F.). The relationship in operating parameters shown by FIGS. 6 and 7 also suggests the desirability of pursuing an oxygen lean regeneration operation which limits heat input to the regenerated catalyst by CO combustion.

It is observed when superimposing the graph of FIG. 7 on FIG. 6, that the 6% hydrogen in the coke curve of FIG. 6 corresponds substantially with the 10% hydrogen in coke curve of FIG. 7. Thus, a greater hydrogen combustion may be tolerated in the combination operation of FIG. 7 than permitted by FIG. 6 without undesirably influencing either the amount of water addition or the wt% Conradson carbon of the feed. In yet another aspect, there is a significant displacement to the right of the 4% hydrogen in coke straight line of FIG. 7 from it's placement in FIG. 6. Thus, the heat balance operation of FIG. 7 can tolerate a higher level of feed Conradson carbon when limiting combustion of hydrocarbonaceous deposits to a $CO_2/CO$ ratio of 1/1 and a regenerated catalyst temperature equal to or less than 760° C. (1400° F.).

A furthr comparison of the graphs of FIGS. 6 and 7 shows that the hydrogen in the coke curves of FIG. 6 are steeper than those of FIG. 7. Thus, the combination of operating parameters of FIG. 6 will tolerate less change in the feed Conradson carbon content than that tolerated by FIG. 7. A dramatic difference in required water addition is also noted when comparing the 6% hydrogen curves of FIGS. 6 and 7 for maintaining a desired heat balance operation. That is, in the high $CO_2/CO$ flue gas ratio operation of FIG. 6, four times as much water is required to be added when the oil feed than is required by the operation of FIG. 7 for a Conradson carbon in the feed of 6%.

FIGS. 8 and 9 presented, herewith, graphically represent significant operating variables contributing to maintaining a selected heat balanced operation based on a premised catalyst temperature in the range of about 732° C. (1350° F.) or 760° C. (1400° F.). FIG. 8 graphically relates the combination of operating parameters for a heat balanced operation relying upon a catalyst temperature of about 732° C. (1350° F.). The operating parameters particularly include catalyst to oil ratio, reactor outlet temperature and water addition rates when used with oil feed preheated to about 177° C. (350° F.). Thus, from FIG. 8, assuming a riser reactor outlet temperature of about 527° C. (980° F.) is desired, and using 15% water with the charged oil feed, the catalyst to oil ratio is preferably about 6. FIG. 6 identifies graphically, for example, that for a 15% water addition, the charged oil feed Conradson carbon may be between 6 and 7 wt.% for 4% hydrogen in the carbonaceous deposit of oil feed conversion. When there is 8% hydrogen in the carbonaceous deposit at the same 15% water addition rate, then the Conradson carbon of the feed must be less than about 5 for the heat balanced operation. FIG. 7 shows, however, that for a $CO_2/CO$ flue gas ratio of 1/1, oil feeds of substantially higher Conradson carbon may be charged with water to the catalytic conversion operation and remain in the heat balanced mode for a premised catalyst regeneration temperature.

The heat balanced operation of the invention, herein defined, is premised on a catalyst temperature equal to or less than 760° C. (1400° F.), the addition of heat absorbing water with the feed, the hydrogen content of carbonaceous deposits of catalytic conversion of charged oil feed, the level of Conradson carbon which can be included in a given operation and the heat input to the catalyst during regeneration to a flue gas $CO_2/CO$ ratio preferably below 3/1 and, more usually, at least about 1/1. Thus, the lower the heat input to the catalyst by combustion of carbonaceous deposits and formed CO, the higher the feed Conradson carbon which can be charged for a given selected catalyst temperature heat balanced operation. The charged water addition rate shown graphically by the Figures and charged with particularly a reduced crude oil feed substantially alters the quality of the oil feed and it's Conradson carbon value which can be processed in a catalyst cracking operation of restricted catalyst temperature selection. The addition of water to the feed in combination with the operating parameters identified in FIGS. 6 thru 8 permits effective catalytic cracking of oil feeds of higher Conradson carbon value than achieved in the absence of water addition.

Having, thus, generally discussed the heat balanced catalytic cracking operation of this invention and identified specific methods for accomplishing marriage of a number of operating functions contributing thereto, it is to be understood that no undue restrictions are to be imposed by reasons thereof, except as defined by the following claims.

What is claimed is:

1. In a process for the cracking of a heavy oil feed comprising Conradson carbon, at least 15 ppm by weight of Ni+V and at least 200 ppm basic nitrogen to form hydrocarbon products comprising gasoline, by contacting, in a riser reaction zone, a regenerated crystalline zeolite cracking catalyst containing at least 5000 ppm of Ni+V, wherein contact of said oil feed with said catalyst is effected in the presence of about 5–20 wt.% water based on feed and produces spent catalyst particles comprising hydrocarbonaceous deposits, said oil feed being a member selected from the group consisting of heavy bottoms from crude oil, heavy bitumen crude oil, heavy crudes approximating the properties of reduced crude, shale oil, tar sand extract, products from coal liquifaction and solvated coal, atmospheric and vacuum reduced crude, extracts or bottoms (raffinate) from solvent de-asphalting, mixtures of said extracts and bottoms, aromatic extract from lube oil refining, tar bottoms, heavy cycle oil, slop oil, refinery waste streams, and mixtures thereof, the improvement which comprises:

(a) regenerating said spent catalyst particles by combusting said hydrocarbonaceous deposits to provide regenerated catalyst particles at a selected and premised temperature limit of less than about 760° C. (1400° F.) at time of contact with the feed;

(b) controlling said premised temperature by maintaining the combination of heavy oil feed catalytic cracking and catalyst regeneration in premised heat balance by a combination of:

(1) adding controlled amounts of liquid water to the oil feed charged with heated catalyst to said riser reaction zone,.

(2) maintaining the heavy oil feed preheat temperature below about 177° C. (350° F.), and (3) restricting oxygen combustion of deposited hydrocarbonaceous material to a $CO_2/CO$ flue gas ratio of 3/1 or less, thus providing low heat output per pound of deposited hydrocarbonaceous material; and (c) passing regenerated catalyst particles of said premised temperature limit in intimate contact with the heavy oil feed water mixture in a catalyst to oil ratio providing a riser outlet product temperature of less than 538° C. (1000° F.).

2. The process of claim 1 wherein the controlled heat balance is achieved by maintaining a relationship within the operating parameters of FIG. 6 when the wt.% Conradson carbon of the feed is in the range of 3 to about 8.

3. The process of claim 1 wherein the heat balance of the combination of heavy oil feed catalytic cracking and catalyst regeneration is achieved by maintaining a relationship within the operating parameters of FIG. 7 when the wt.% Conradson carbon of the feed is less than about 11 for a premised regenerated catalyst temperature less than about 760° C. (1400° F.).

4. The process of claim 1 wherein regeneration of the catalyst is accomplished in the presence of a material promoting the conversion of deposited carbonaceous material preferentially to CO to thereby lower the temperature at which a given amount of deposited coke is removed.

5. The process of claim 1 wherein the oil feed cracking-catalyst regeneration operation is conducted in the absence of added tin, antimony or added molecular hydrogen and wherein the liquid water added with the oil feed contains from about 500 to 5000 ppm of $H_2S$ dissolved therein.

6. The process of claim 1 wherein the liquid water is admixed with the heavy oil feed in an atomizing nozzle zone and the atomized mixture is sprayed into contact with a rising suspension of said catalyst of said premised temperature limit in a portion of a riser reaction zone.

7. The process of claim 1 wherein the dehydrogenation-condensation activity of accumulated heavy metal contaminants on the catalyst from the oil feed is inhibited by introducing hydrogen sulfide gas with the oil feed and water charged to the riser reaction zone.

8. The process of claim 1 wherein the heat generated during combustion of hydrocarbonaceous material in the catalyst regeneration operation is restricted by the addition of water, steam, or a mixture thereof thereto.

9. The process of claim 1 wherein regeneration of the catalyst is accomplished in a sequence of regeneration zones under conditions selected to more particularly maximize CO production by employing less than the stoichiometric amount of oxygen in each zone required to burn hydrogen and coke on the catalyst.

10. In a process for converting in a riser reaction zone a residual oil comprising components boiling above 552° C. (1025° F.), greater than 15 ppm Ni+V, at least 200 ppm basic nitrogen with a crystalline zeolite cracking catalyst comprising at least 5000 ppm of accumulated Ni+V and a residual carbon on regenerated catalyst of 0.1 wt.% or less to form hydrocarbon products comprising gasoline thereby depositing hydrocarbonaceous material on the zeolite catalyst, the method for maintaining a temperature restricted heat balanced operation which comprises:

(a) removing deposited hydrocarbonaceous material from said catalyst by combustion in a first stage of regeneration with an oxygen lean gas in a temperature restricted regeneration environment below or equal to about 760° C. (1400° F.), (b) passing partially regenerated catalyst particles of step (a) to a second separate stage of catalyst regeneration for a contact time therein less than one half of that employed in said first stage of catalyst regeneration to minimize hydrothermal damage to said catalyst and provide regenerated catalyst comprising residual coke at a premised temperature of 760° C. (1400° F.) or less, (c) passing catalyst particles thus regenerated and the residual oil to the riser reaction zone, (d) maintaining the operation in substantial heat balance by adding water and an atomizing diluent hydrocarbon to the residual oil feed at a temperature of below about 177° C. (350° F.) to form a feed-water-diluent hydrocarbon mixture and contacting said feed-water-diluent hydrocarbon mixture with said regenerated catalyst at said premised temperature, and (e) controlling steps (a), (b) and (d) to limit the heat transferred by the catalyst to the residual oil feed during conversion to an amount within the range of 500 to 1200 BTUs per pound of oil feed.

11. The process of claim 10 wherein the regenerated catalyst temperature is restricted by the combination of:

(a) adding water, steam or a combination thereof to a first stage of regeneration, (b) adding a CO combustion promoter other than oxygen which will reduce the temperature of converting coke to carbon dioxide and CO to $CO_2$, (c) providing indirect heat exchange with a cooling fluid in one or more stages of catalyst regeneration, (d) indirectly cooling the catalyst passed from a first stage of regeneration to a second stage of regeneration and limiting the oxygen concentration charged to each stage of catalyst regeneration thus limiting the formation of $CO_2$ in the flue gas to a $CO_2/CO$ ratio of 1/1 or less.

12. A method for catalytically cracking in a riser reaction zone a heavy oil feed comprising Conradson carbon greater than 3 wt.% in a heat balanced operation at a premised catalyst temperature of about 760° C. (1400° F.) without undesirably influencing the operation heat balance, said cracking being performed to form hydrocarbon products comprising gasoline, said oil feed being a member selected from the group consisting of heavy bottoms from crude oil, heavy bitumen crude oil, heavy crudes approximating the properties of reduced crude, shale oil, tar sand extract, products from coal liquifaction and solvated coal, atmospheric and vacuum reduced crude, extracts or bottoms (raffinate) from solvent de-asphalting, mixtures of said extracts and bottoms, aromatic extract from lube oil refining, tar bottoms, heavy cycle oil, slop oil, refinery waste streams, and mixtures thereof, which method comprises maintaining the operating parameters of Conradson carbon in the feed, hydrogen in deposited carbonaceous material on catalyst and water addition to the feed being catalytically cracked in accordance with the relationship of operating parameters identified by FIGS. 7 and 8 to control riser outlet temperature within the range of 510° C. (950° F.) to 532° C. (990° F.).

13. A method for catalytically cracking reduced crude oil feeds comprising Conradson carbon in the presence of a premised catalyst temperature of about 760° C. (1400° F.), said cracking being carried out to form hydrocarbon products comprising gasoline, which method comprises maintaining the functions of oil feed, Conradson carbon, hydrogen in deposited carbonaceous material, and water addition to the oil feed to be converted in accordance with the relationship of operating parameters identified in FIGS. 6 and 9 for a catalyst to oil ratio in the range of about 4.5 to 7.5.

14. A method for effecting the catalytic cracking of a residual oil feed in a riser reaction zone to form hydrocarbon products comprising gasoline and regeneration of catalyst used therein in a heat balanced operating mode provided by catalyst of premised temperature restriction and obtained by limiting the regeneration flue gas $CO_2/CO$ ratio in the range of 1/1 to about 3/1, said residual oil feed comprising components boiling above about 552° C. (about 1025° F.), greater than about 15 ppm by weight of Ni and V, and at least about 200 ppm basic nitrogen, which method comprises:

(a) charging a residual oil feed at a temperature not to exceed 177° C. (350° F.) and mixed with liquid water to a catalytic riser cracking zone charged with catalyst at a premised regenerated catalyst temperature in the range of about 732° C. (1350° F.) to about 760° C. (1400° F.), said liquid water mixed with said oil feed being sufficient to permit cracking of an oil feed with a Conradson carbon value about 4 wt.% without upsetting the heat balance of the premised regenerated catalyst temperature operation when employing a catalyst-to-oil ratio in the range of 5 to 8.5, and from about 4 to 10 wt.% hydrogen in deposited carbonaceous material, and (b) maintaining the relationship in operating parameters limited by FIG. 7 for the heat balance operation.

15. The method of claim 14 wherein the hydrogen in deposited carbonaceous material of oil feed cracking is less than about 8 wt.% so that the oil feed Conradson carbon value may be greater than 4 wt.% for a water addition to the oil feed in the range of 5 to 25 wt.% and wherein the water-feed mixture is charged to the riser reaction zone at the premised catalyst temperature.

16. The method of claim 15 wherein the catalyst to oil ratio employed with the premised catalyst temperature is sufficient to provide a riser reaction zone outlet temperature in the range of 504° C. (940° F.) to about 532° C. (990° F.).

* * * * *